(12) United States Patent
Qiao et al.

(10) Patent No.: US 11,716,393 B1
(45) Date of Patent: Aug. 1, 2023

(54) SWITCHING CONNECTORS FOR ESTABLISHING SESSIONS TO ACCESS SERVICES ACCORDING TO NETWORK CONDITIONS

(71) Applicant: Citrix Systems, Inc., Fort Lauderdale, FL (US)

(72) Inventors: Zongpeng Qiao, Nanjing (CN); Ze Chen, Nanning (CN); Kun Li, Nanjing (CN); Ge Gao, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 17/744,006

(22) Filed: May 13, 2022

Related U.S. Application Data

(63) Continuation of application No. PCT/CN2022/086540, filed on Apr. 13, 2022.

(51) Int. Cl.
*H04L 67/141* (2022.01)
*H04L 67/51* (2022.01)

(52) U.S. Cl.
CPC .......... *H04L 67/141* (2013.01); *H04L 67/51* (2022.05)

(58) Field of Classification Search
CPC ... H04L 67/141; H04L 67/51; H04L 29/0619; H04L 29/06319; H04L 29/08576; H04L 29/06176; H04L 29/08585; H04L 65/1006; H04L 65/1066; H04L 65/1069; H04L 69/24; H04M 7/00; H04W 36/0011; H04W 76/00
See application file for complete search history.

(56) References Cited

U.S. PATENT DOCUMENTS

| | | | |
|---|---|---|---|
| 9,262,642 B1 * | 2/2016 | Roth .................. | G06F 21/45 |
| 10,158,727 B1 * | 12/2018 | Mukhopadhyaya .. | H04W 4/023 |
| 10,965,737 B1 * | 3/2021 | Parulkar ............... | H04L 63/16 |
| 11,070,646 B1 * | 7/2021 | Lingafelt .............. | H04L 67/51 |
| 2006/0047704 A1 * | 3/2006 | Gopalakrishnan ...... | G06F 16/51 |
| | | | 707/E17.031 |
| 2006/0285489 A1 | 12/2006 | Francisco et al. | |
| 2011/0125509 A1 * | 5/2011 | Lidstrom ............... | G06Q 30/02 |
| | | | 705/1.1 |

(Continued)

FOREIGN PATENT DOCUMENTS

WO    WO-2015/066728 A1    5/2015

OTHER PUBLICATIONS

International Search Report on PCT/CN2022/086540 dated Nov. 29, 2022.

*Primary Examiner* — Michael Won

(57) ABSTRACT

Described embodiments provide systems and methods for establishing a session. A client may identify, to access at least one of a plurality of services via a connector, a plurality of metrics on network conditions between the connector and a corresponding service of the plurality of services. The client may use at least one value of the plurality of metrics to scale each metric of the plurality of metrics. The client may determine a score for each service of the plurality of services as a function of each of the plurality of scaled metrics for the corresponding service. The client may select, from the plurality of services, a service based at least on the score. The client may establish a session with the connector to access the selected service.

20 Claims, 15 Drawing Sheets

(56) References Cited

U.S. PATENT DOCUMENTS

| | | | |
|---|---|---|---|
| 2011/0161076 A1* | 6/2011 | Davis | G10L 15/22 |
| | | | 704/E15.001 |
| 2017/0017368 A1* | 1/2017 | Maheshwari | H04L 41/22 |
| 2017/0264449 A1 | 9/2017 | Seetharaman et al. | |
| 2018/0198733 A1 | 7/2018 | Morgan et al. | |
| 2020/0067789 A1* | 2/2020 | Khuti | H04L 41/5009 |
| 2021/0168027 A1* | 6/2021 | Parulkar | H04L 43/16 |
| 2022/0078806 A1* | 3/2022 | Sevindik | H04W 72/12 |
| 2023/0063998 A1* | 3/2023 | Cili | H04W 64/006 |

\* cited by examiner

SWITCHING CONNECTORS FOR ESTABLISHING SESSIONS TO ACCESS SERVICES ACCORDING TO NETWORK CONDITIONS

CROSS-REFERENCE TO RELATED APPLICATIONS

This application is a continuation of, and claims priority to and the benefit of, International Patent Application No. PCT/CN2022/086540, titled "SWITCHING CONNECTORS FOR ESTABLISHING SESSIONS TO ACCESS SERVICES ACCORDING TO NETWORK CONDITIONS", and filed on Apr. 13, 2022, the entire contents of which are hereby incorporated herein by references in its entirety for all purposes.

FIELD OF THE DISCLOSURE

The present application generally relates to communication sessions. In particular, the present application relates to systems and methods for switching connectors for establishing sessions to access services.

BACKGROUND

A client may communicate with a server via one or more computer networks. Various conditions may affect the communications between the client and the server.

BRIEF SUMMARY

This summary is provided to introduce a selection of concepts in a simplified form that are further described below in the Detailed Description. This summary is not intended to identify key features or essential features, nor is it intended to limit the scope of the claims included herewith.

In a networked environment, an agent running on a client may establish a session with a connector of a gateway to access resources hosted on one or more servers. To facilitate access to the resources for the session, the connector at the gateway may interface with a delivery agent. The connector may also establish and provide a virtual desktop through the delivery agent for the client. The virtual desktop may correspond to a graphical user interface (GUI) of an operating system running on a remote machine that is managed by the gateway or connector and provided for display via the agent on the client. Through the virtual desktop established for the session, the user of the client may interact with GUI elements to access the applications and resources hosted on the various servers.

The gateway may be intermediary to the client and the server, and may communicate across one set of networks with the client and with another set of networks with the various servers. In addition, the gateways, connectors, and services may be situated in different physical locations. Through the duration of the session, the conditions in the network between the client and the gateway and the network between the gateway and the servers may fluctuate. The fluctuation in network conditions may in turn lead to the differing performance of the session between the client and the connector. As a result, the quality of experience in accessing the applications and other resources from the perspective of the user may also vary.

When there is an issue with the network and the user is having a poor experience due to such an issue, it may be difficult to ascertain the means to address the low network performance within the environment. Without any means to address the network conditions, the agent on the client may continue the session with the connector. As such, the user of the client may continue to face poor experience with the virtual desktop. Moreover, the network conditions and the experience that the user may face at the other connectors may be unknown ahead of establishing the connection. Due to the lack of a way to objectively determine such measures, it may be difficult to determine which other connector to use to establish a new session when the performance and quality of the current session is poor. These problems may be further compounded by more and more servers that are to be accessed via the connector by the user on the client.

To address these and other technical challenges, the agent on the client may monitor for a fluency score of the connector to which the client has established a session to access the resources. The fluency score may be calculated using a myriad of factors, such as latency, packet loss, bandwidth, jitter, and throughput, among others, in the network between the client and the connector as well as the network between the connector and the servers. These factors may take into account the numerous causes for the variability in network conditions, such as a firewall, physical bandwidth, and optimization at the gateways, among others. The fluency score may be a proxy measure of the user's experience of the applications and resources accessible through the connector. Upon initiation of the session, the agent on the client may continuously keep track of the fluency score with the connector.

To determine the fluency score, the agent on the client may collect network metrics related to the factors between the client itself and the connector. The client may also request the connector provide the network metrics between the connector and each server. For metrics such as latency and packet loss, the agent may use ping to determine these metrics from the raw communication data. Once obtained, the agent may convert the values of the latency and packet loss metrics into a positive comparable form. For example, if the values of the latency and packet loss were 13 and 14 respectively, the agent may convert the values to $\frac{1}{13}$ and $\frac{1}{14}$ respectively. For bandwidth, jitter, and throughput, the agent may use a network performance tool (e.g., Iperf) to gather these metrics. The tool may provide the raw values for the bandwidth, jitter, and throughput metrics in the comparable form.

Upon identification of the metrics, the agent may normalize or scale the network condition metrics to convert to a 0 to 1 scale to facilitate the comparison of the values. The network metrics may be scaled in accordance with any scaling function. For example, in accordance with min-max rescaling, each network metric may be normalized based on a difference between a maximum value and a maximum value of the set of network metrics for a given network. With each value scaled, the agent may calculate the fluency score for the network as a weighted average of the scaled network metrics. The agent may determine separate fluency scores for the network between the connector and each server and the network between the client and the connector.

For the network between the connector and the servers, the agent may compare the fluency scores. Among multiple servers for a same type of service, the agent may select the server with the best fluency score for each type. Among servers of the different types of service, the agent may select the server with the worst fluency score to determine the overall fluency score between the client and the server. The worst fluency score may be selected to account for the short board effect or the potential for bottleneck in network performance between the client and the server over the connector. The agent may determine the overall fluency score between the client and the servers as a function of the fluency score between the client and the connector and the worst fluency score between the connector and the services.

With the determination for the connector to which the client is connected, the agent may compare the overall fluency score and a threshold. The threshold may delineate a value for the fluency score at which the network performance for the session is determined to be poor. When the fluency score is above or at the threshold, the agent may determine that the network performance is satisfactory and may continue the session with the connector. The agent may sleep and measure the network metrics at a later point.

When the fluency score is below the threshold, the agent may determine that the network performance is unsatisfactory and may proceed to identify candidate connectors available for establishing a new connection. For each candidate connector, the agent may determine the fluency score in a similar manner as with the previous connector. The agent may collect network metrics between the client itself and each candidate connector, and may request each connector for the network metrics between the connector and the servers to be accessed. Based on the scaled network metrics, the agent may calculate a fluency score between each candidate connector and each server. Among multiple servers for a same type of service, the agent may select the server with the best fluency score for each type. Among servers of the different types of service, the agent may select the server with the worst fluency score. With the selection, the agent may determine the overall fluency score for each candidate connector based on the selected fluency score between the connector and the server and the fluency score between the client and the connector.

From the candidate connectors, the agent may select the connector with the best fluency score to which establish a new session. With the selection, the agent may provide a prompt for the user as to whether to accept the connector to which to switch connections. If the user declines, the agent may continue with the existing session with the current connector. The agent may refrain from repeatedly providing the prompt thereafter. Otherwise, if the user accepts, the agent may establish a new session with the selected connector. The connector may provide a virtual desktop on one of the available delivery agent to the client to access the servers through the virtual desktop. With the establishment of the session, the user on the client may use the virtual desktop to access the applications and other resources hosted on the server.

In this manner, the agent on the client may be configured to automatically detect and switch sessions with better connection qualities to improve the user's experience of the applications. In addition, the agent may allow for estimating quality of new potential connections and switching to assist the user in finding a new session with higher quality, when the experience in the current session is poor. The reliance on selecting connectors as opposed to individual delivery agents in each separate sites to monitor network quality. Furthermore, the delivery agents may not be always active on standby, thereby reducing the amount of network and computing resources consumed at each connector and gateway. Also, by providing the user the prompt to select the recommended connector, the agent may afford the user greater ability to control the connections between the client and the applications to be accessed. In addition, the agent may objectively quantify the user experience of the applications to be accessed to find the best connection from all the network conditions metrics.

Aspects of the present disclosure are directed to systems, methods, and non-transitory computer readable media for establishing a session. A client may identify, to access at least one of a plurality of services via a connector, a plurality of metrics on network conditions between the connector and a corresponding service of the plurality of services. The client may use at least one value of the plurality of metrics to scale each metric of the plurality of metrics. The client may determine a score for each service of the plurality of services as a function of each of the plurality of scaled metrics for the corresponding service. The client may select, from the plurality of services, a service based at least on the score. The client may establish a session with the connector to access the selected service.

In some embodiments, the client may identify, to access the service via at least one of a plurality of connectors, a second plurality of metrics on network conditions between the client and a corresponding connector of the plurality of connectors. In some embodiments, the client may use at least one value of the second plurality of metrics to scale each of the second plurality of metrics. In some embodiments, the client may determine a score for each connector of the plurality of connectors as the function of each of second plurality of scaled metrics for the corresponding connector. In some embodiments, the client may select, from the plurality of connectors, the connector based at least on the score and the second score.

In some embodiments, the client accessing at least one of the plurality of services via a second session with a second connector may determine a second score for the second connector of the plurality of connectors as a function of each of a second plurality of scaled metrics for the second connector. In some embodiments, the client may identify the first plurality of metrics between the connector different from the second connector and the corresponding service, responsive to determining that the second score for the second connector does not satisfy a threshold.

In some embodiments, the client accessing at least one of the plurality of services via a second session with a second connector may determine a second score for the second connector of the plurality of connectors as a function of each of a second plurality of scaled metrics for the second connector. In some embodiments, the client may continue the second session to access at least one of the plurality of services, responsive to determining that the second score for the second connector satisfies a threshold.

In some embodiments, the client may identify that the plurality of services are of different types. In some embodiments, the client may select, from the plurality of services, the service having a highest score with which the client is to access via the session. In some embodiments, the client may identify that the plurality of services, that the plurality of services are of a same type. In some embodiments, the client may select, from the plurality of services, the service having a lowest score with which to determine a second score for network conditions between the client and the connector.

In some embodiments, the client may provide a prompt identifying the connector with which to establish the session to access the service. In some embodiments, the client may establish the session with the connector to access the service, responsive to a selection of the connector via the prompt. In some embodiments, the client may provide a prompt identifying the connector with which to establish the session to access the service. In some embodiments, the client may maintain a second session with a second connector to access at least one of the plurality of services, responsive to a rejection of the connector via the prompt.

In some embodiments, the client may use a minimum value and a maximum value of the plurality of metrics to scale the plurality of metrics in accordance with a normalization function. In some embodiments, the client may establish the session with the connector to initiate a virtual desktop via which the service is accessible.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 1A:
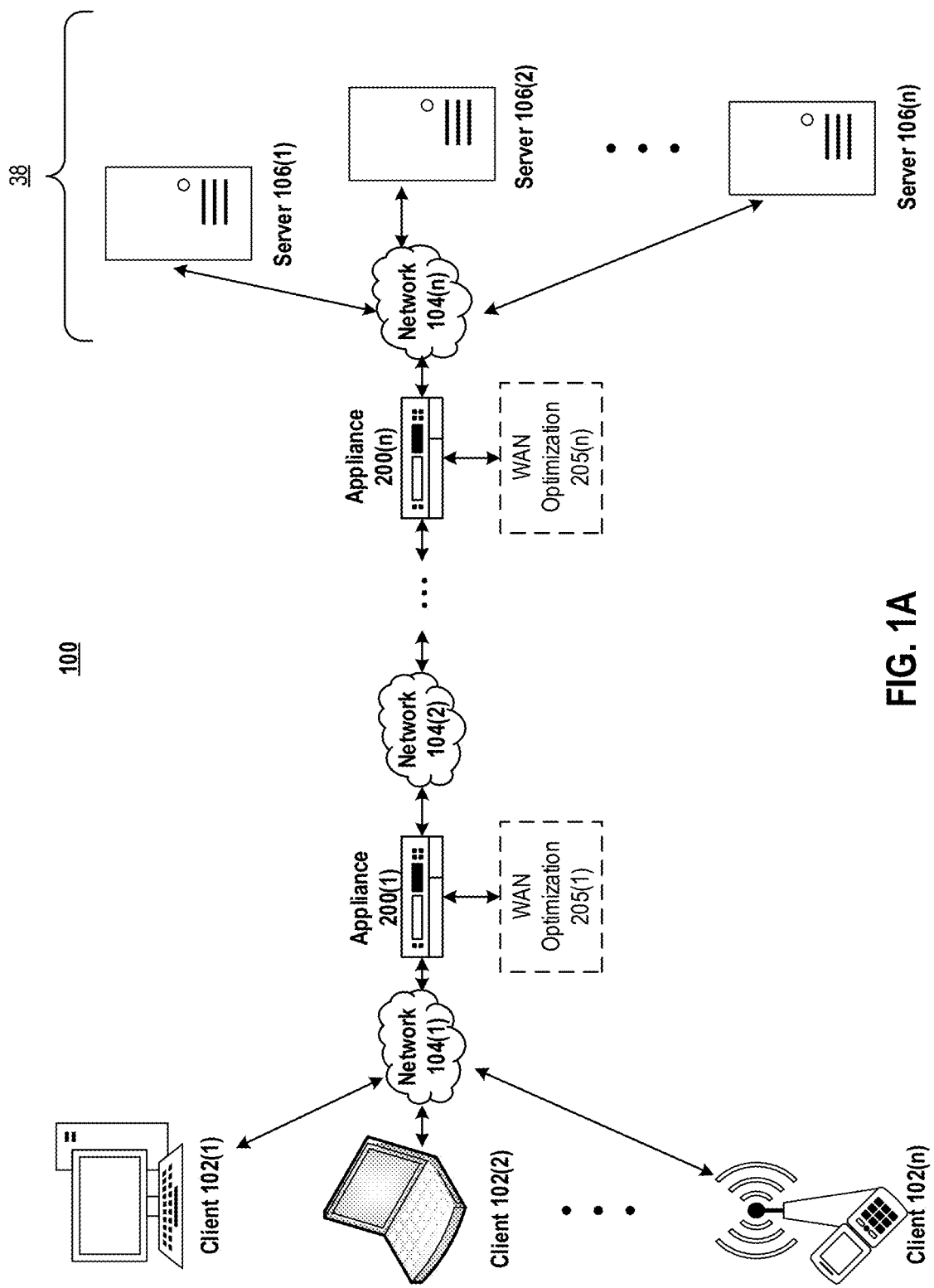
FIG. 1A is a block diagram of a network computing system, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes embodiments of systems and methods for providing a clustered appliance architecture environment; and Section E describes embodiments of systems and methods for switching connectors to establish sessions in accordance with scaled network condition scores.

A. Network and Computing Environment

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as NetScaler® products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as CloudBridge® products sold by Citrix Systems, Inc. of Fort Lauderdale, Fla.

Figure 1B:
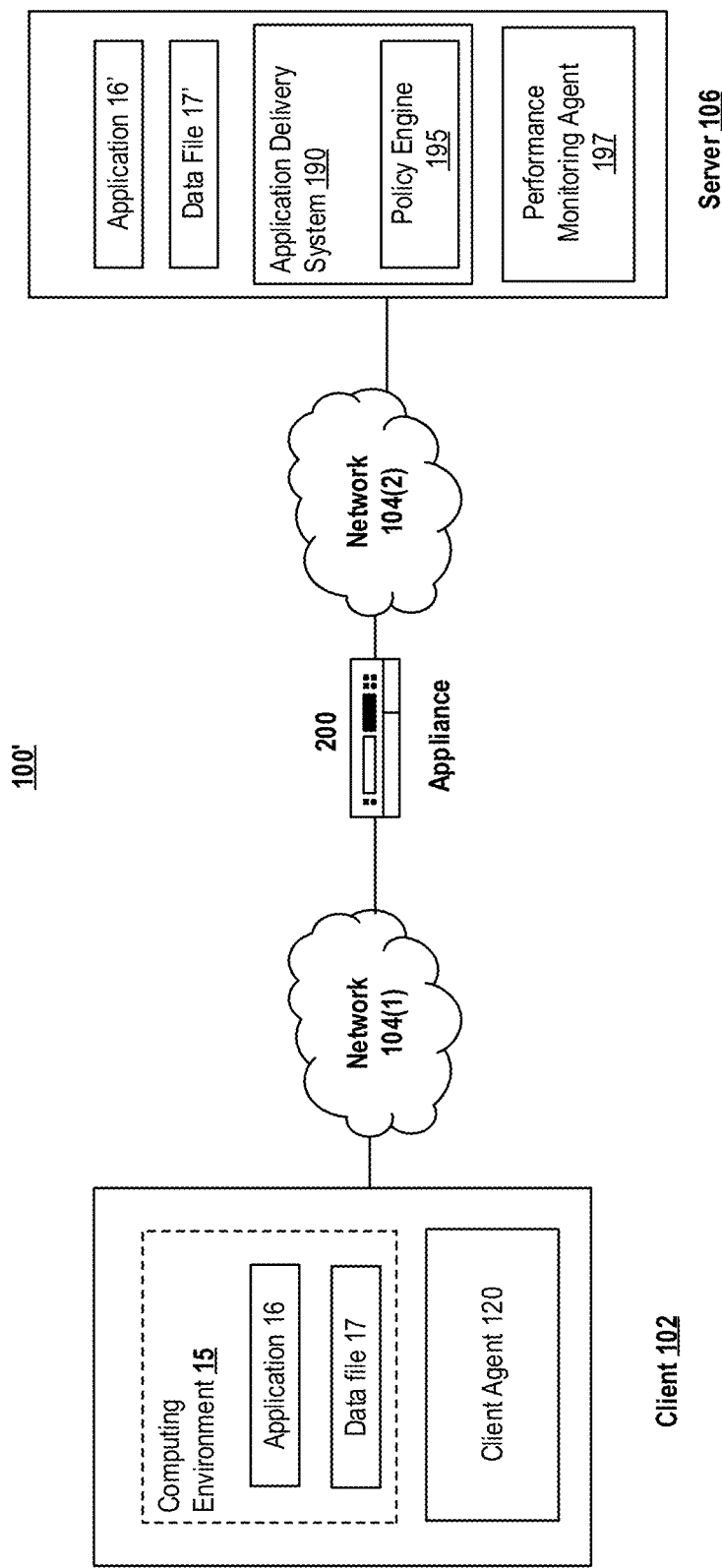
FIG. 1B is a block diagram of a network computing system for delivering a computing environment from a server to a client via an appliance, in accordance with an illustrative embodiment.

Referring to FIG. 1B, an example network environment 100' for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application 16, that accesses, processes or uses a data file 17. Computing environment 15, application 16 and/or data file 17 may be delivered to the client 102 via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as XenApp® or XenDesktop®.

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 50 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliances 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as EdgeSight by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
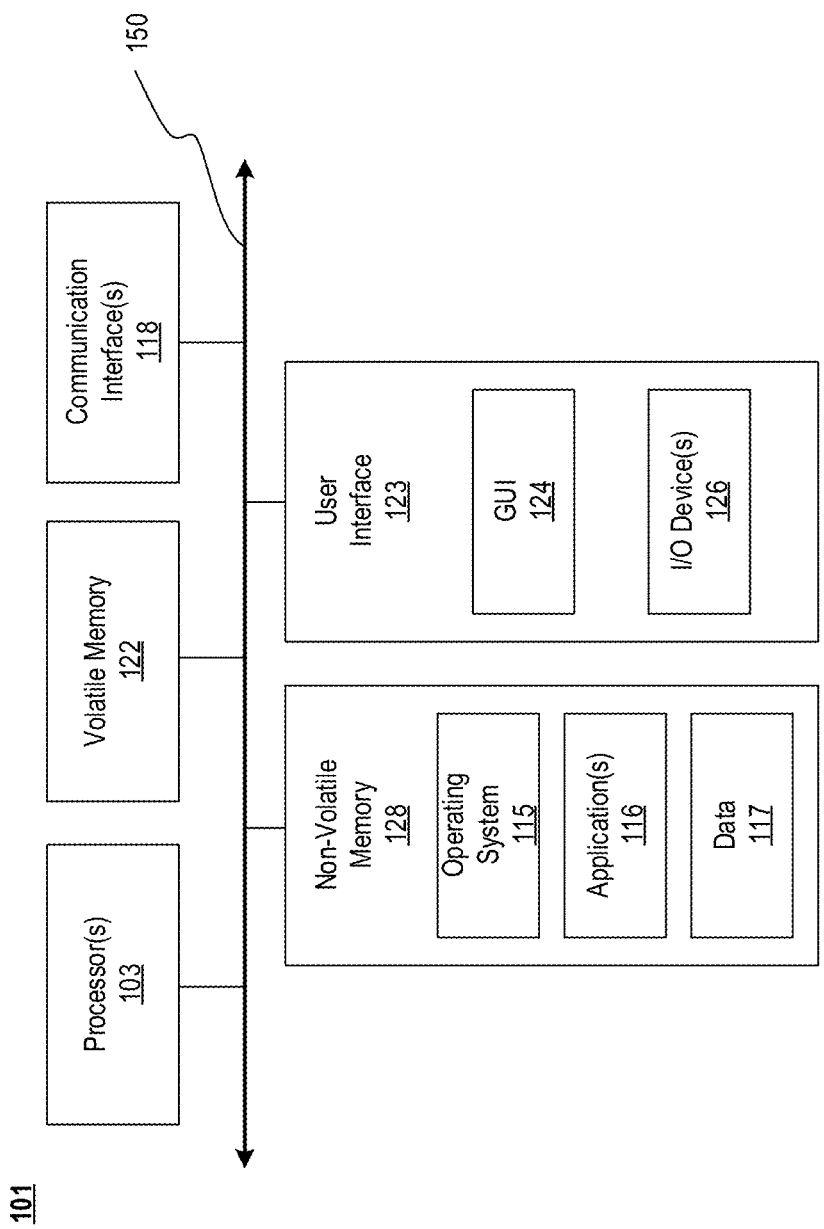
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
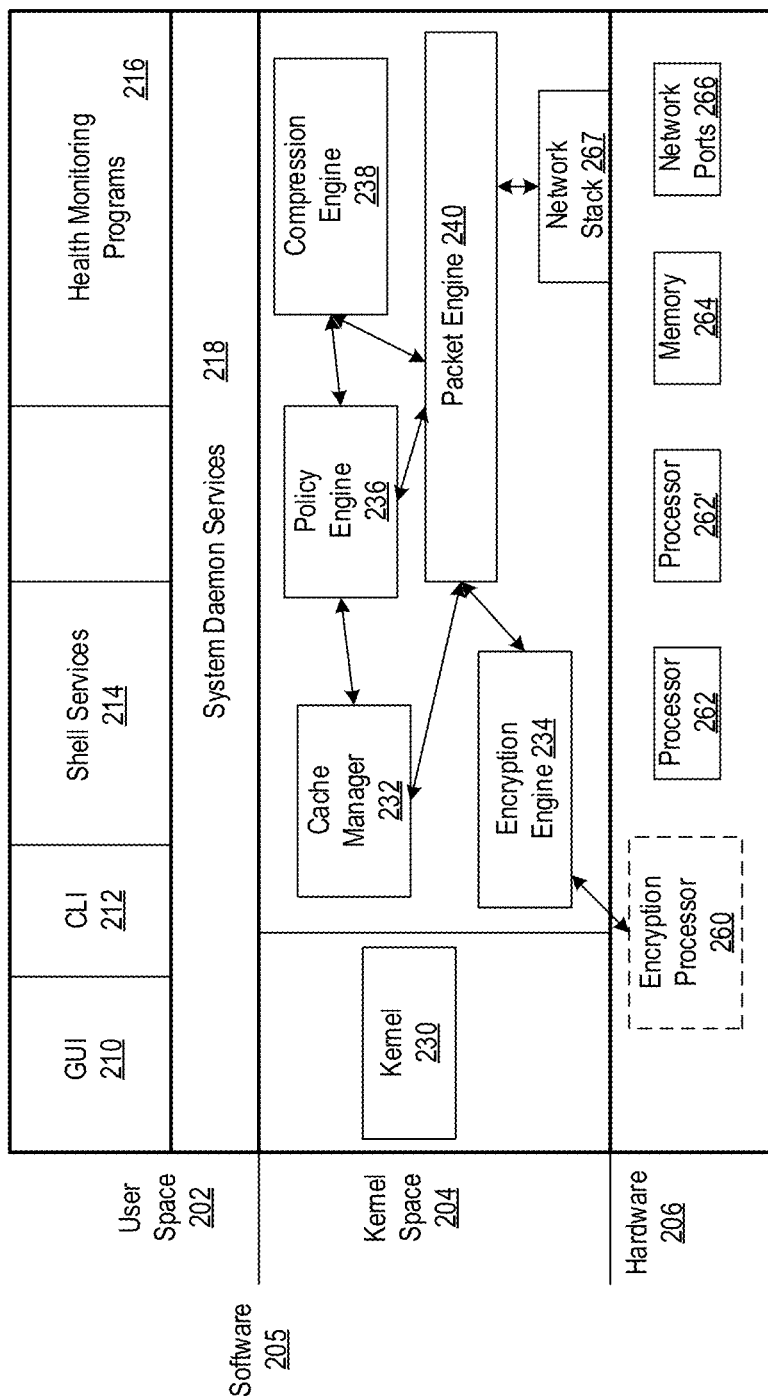
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reduce the access time of the data. In some embodiments, the cache manager 232 may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine whether a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layers connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a XEN hypervisor, for example as provided by the open source Xen.org community. In an illustrative embodiment, device 302 executing a hypervisor that creates a virtual machine platform on which guest operating systems may execute is referred to as a host server. In such an embodiment, device 302 may be implemented as a XEN server as provided by Citrix Systems, Inc., of Fort Lauderdale, Fla.

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
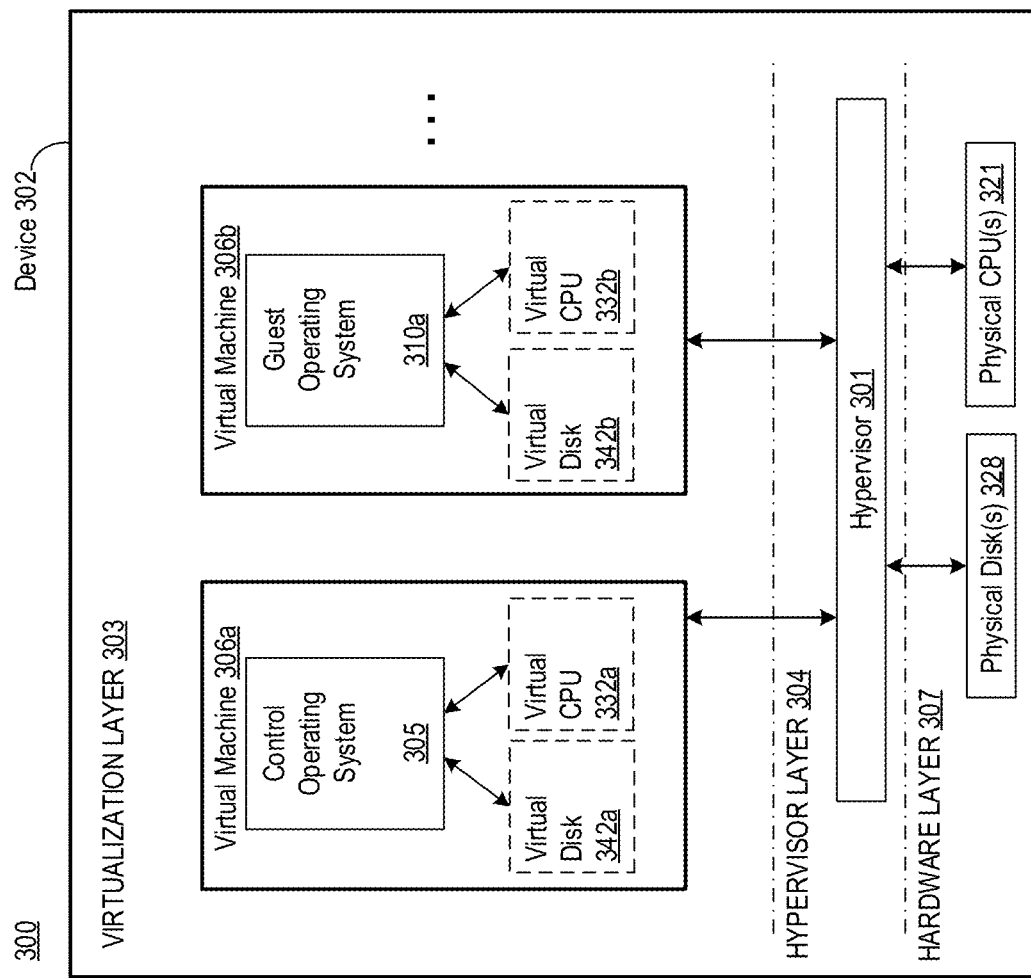
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

D. Systems and Methods for Providing a Distributed Cluster Architecture

Figure 4:
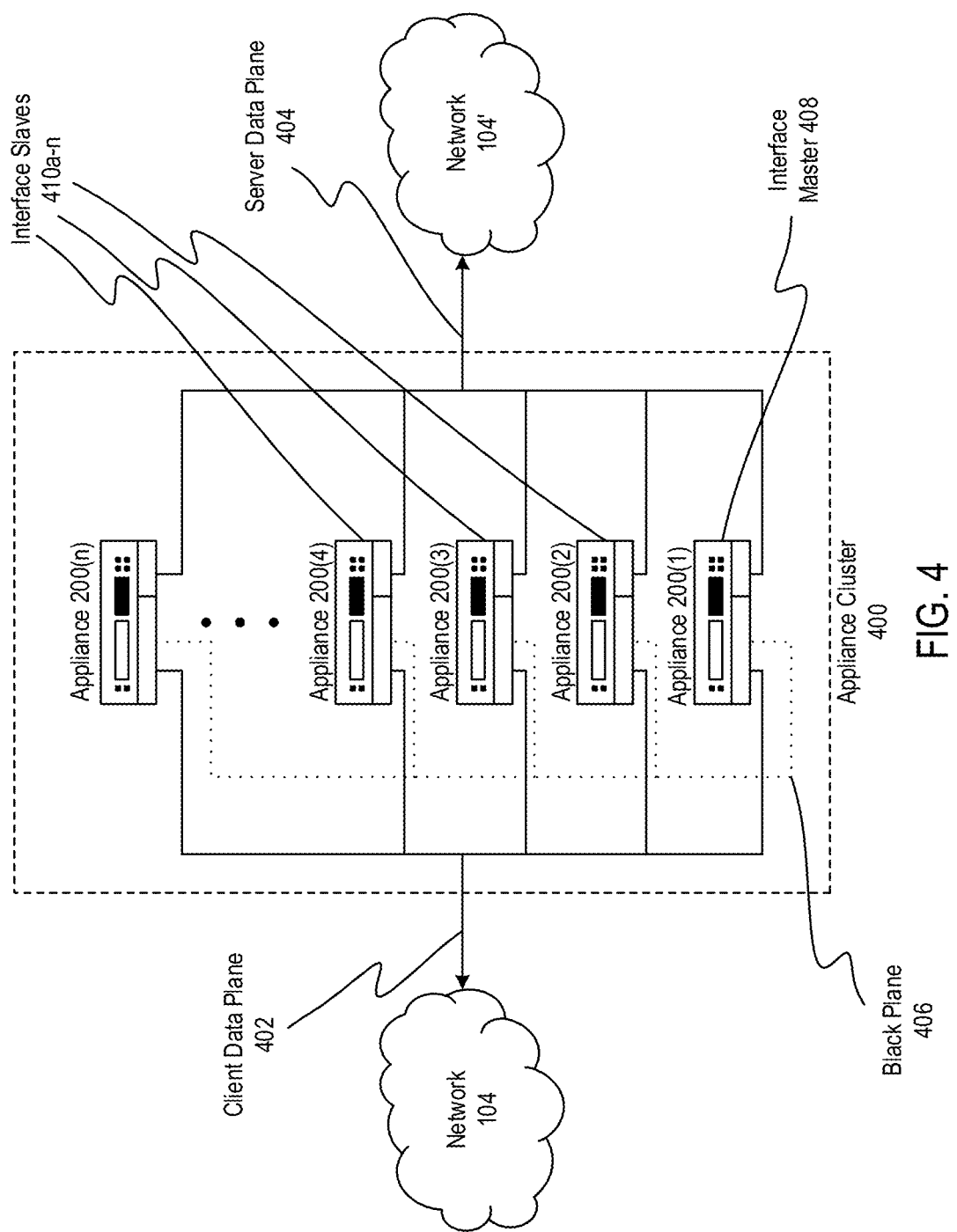
FIG. 4 is a block diagram of a cluster system, in accordance with an illustrative embodiment.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. FIG. 4 shows a block diagram of an illustrative computing device cluster or appliance cluster 400. A plurality of appliances 200 or other computing devices (e.g., nodes) may be joined into a single cluster 400. Cluster 400 may operate as an application server, network storage server, backup service, or any other type of computing device to perform many of the functions of appliances 200 and/or 205.

In some embodiments, each appliance 200 of cluster 400 may be implemented as a multi-processor and/or multi-core appliance, as described herein. Such embodiments may employ a two-tier distribution system, with one appliance if the cluster distributing packets to nodes of the cluster, and each node distributing packets for processing to processors/cores of the node. In many embodiments, one or more of appliances 200 of cluster 400 may be physically grouped or geographically proximate to one another, such as a group of blade servers or rack mount devices in a given chassis, rack, and/or data center. In some embodiments, one or more of appliances 200 of cluster 400 may be geographically distributed, with appliances 200 not physically or geographically co-located. In such embodiments, geographically remote appliances may be joined by a dedicated network connection and/or VPN. In geographically distributed embodiments, load balancing may also account for communications latency between geographically remote appliances.

In some embodiments, cluster 400 may be considered a virtual appliance, grouped via common configuration, management, and purpose, rather than as a physical group. For example, an appliance cluster may comprise a plurality of virtual machines or processes executed by one or more servers.

As shown in FIG. 4, appliance cluster 400 may be coupled to a client-side network 104 via client data plane 402, for example to transfer data between clients 102 and appliance cluster 400. Client data plane 402 may be implemented a switch, hub, router, or other similar network device internal or external to cluster 400 to distribute traffic across the nodes of cluster 400. For example, traffic distribution may be performed based on equal-cost multi-path (ECMP) routing with next hops configured with appliances or nodes of the cluster, open-shortest path first (OSPF), stateless hash-based traffic distribution, link aggregation (LAG) protocols, or any other type and form of flow distribution, load balancing, and routing.

Appliance cluster 400 may be coupled to a second network 104' via server data plane 404. Similarly to client data plane 402, server data plane 404 may be implemented as a switch, hub, router, or other network device that may be internal or external to cluster 400. In some embodiments, client data plane 402 and server data plane 404 may be merged or combined into a single device.

In some embodiments, each appliance 200 of cluster 400 may be connected via an internal communication network or back plane 406. Back plane 406 may enable inter-node or inter-appliance control and configuration messages, for inter-node forwarding of traffic, and/or for communicating configuration and control traffic from an administrator or user to cluster 400. In some embodiments, back plane 406 may be a physical network, a VPN or tunnel, or a combination thereof.

Figure 5:
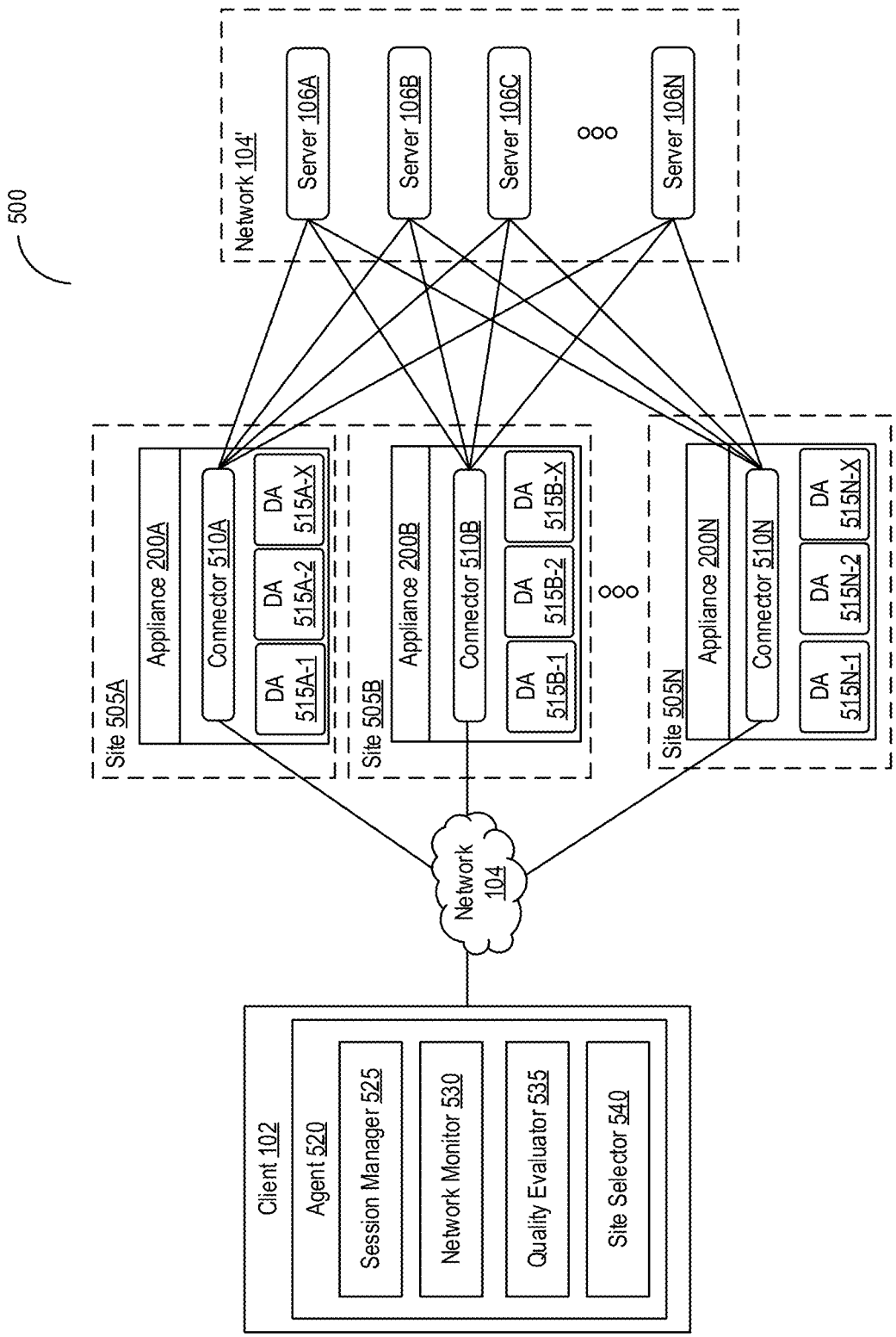
FIG. 5 is a block diagram of an embodiment of a system for establishing sessions according to network conditions, in accordance with an illustrative embodiment.

E. Systems and Methods for Switching Connectors to Establish Sessions in Accordance with Scaled Network Condition Scores Referring now to FIG. 5, depicted is a system 500 for establishing sessions according to network conditions. In overview, the system 500 may include at least one client 102, a set of appliances 200A-N (hereinafter generally referred to as appliances 200), and one or more servers 106A-N (hereinafter generally referred to as servers 106), among others. The system 500 may include at least one network 104 to communicatively couple the client 102 with the set of appliances 200. The system 500 may also include at least one network 104' to communicatively couple the set of appliance 200 with the one or more servers 106, and with one another.

Continuing on, each appliance 200 may be situated, arranged, or otherwise located at a site 505A-N (hereinafter generally referred to as sites 505). The site 505 may correspond to a physical or a geographic location at which the corresponding appliance 200 is situated. In some embodiments, the site 505 may have multiple appliances 200. Each appliance 200 may have access to, may be communicatively with, or otherwise may include at least one connector 510A-N (hereinafter generally referred to as the connector 510). Each connector 510 may host, support, or otherwise include a set of delivery agents 515A-1 to 515N-X (hereinafter generally referred to as delivery agents 515) accessible through the respective appliance 200. The client 102 may have or include at least one agent 520 (also referred herein as a monitoring agent). The agent 515 may include at least one session manager 525, at least one network monitor 530, at least one quality evaluator 535, and at least one site selector 540, among others. In some embodiments, at least a portion of the functionalities of the agent 515 (including the session manager 525, the network monitor 530, the quality evaluator 535, and the site selector 540) may be implemented or performed at the appliance 200.

The systems and methods of the present solution may be implemented in any type and form of device, including clients 102, servers 106, or appliances 200. As referenced herein, a "server" may sometimes refer to any device in a client-server relationship, e.g., an appliance 200 in a handshake with a client device 102. The present systems and methods may be implemented in any intermediary device or gateway, such as any embodiments of the appliance or devices 200 described herein. Some portion of the present systems and methods may be implemented as part of a packet processing engine and/or virtual server of an appliance, for instance. The systems and methods may be implemented in any type and form of environment, including multi-core appliances, virtualized environments and/or clustered environments described herein.

Figure 6:
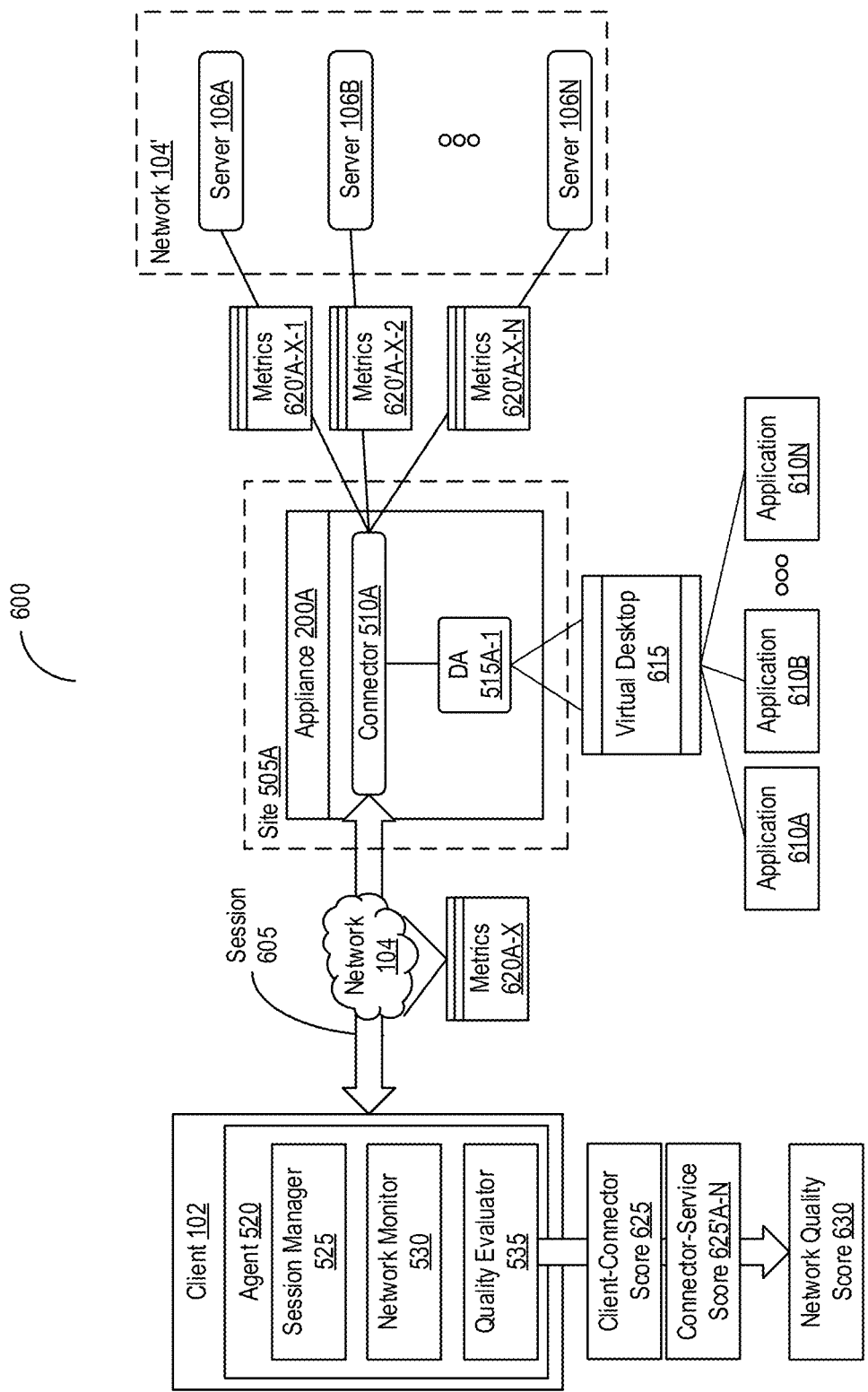
FIG. 6 is a block diagram of an embodiment of a process for determining whether to switch connectors in the system for establishing session, in accordance with an illustrative embodiment.

Referring now to FIG. 6, depicted is a block diagram of a process 600 for determining whether to switch connectors in the system 500. The process 600 may correspond to operations performed in the system 500 for establishing the session and monitoring network conditions for the current session to determine whether to switch connectors. Under the process 600, the session manager 525 executing on the client 102 may initiate and establish at least one session 605 with a connector 510 of an appliance 200. The session 605 may be to provide the client 102 access applications 610A-N (hereinafter applications 610). The applications 610 may be, for example, a word processor, an image editor, a video editor, a video game, a web browser, and an electronic mail agent, among others.

Each application 610 may correspond to an application (e.g., remote or virtual) hosted on one or more of the corresponding servers 106 (sometimes referred herein as services). Conversely, each server 106 may support, facilitate, or host resources for a corresponding application 610. The set of servers 106 for the applications 610 to be accessed may be of different function types. Each function type may correspond to the respective application 610. The servers 106 may be situated, arranged, or otherwise arranged at different physical locations. For example, the first application 610A may be a word processor reliant on cloud resources managed by a first server 106A located in Florida, US. The second application 610B may be an image editor whose functions may be carried out in part on a second server 106B situated in Toronto, Canada. The session 605 may communicate data between the agent 502 on the client 102 and the connector 510 for the applications 610. The session 605 may be established in accordance with any number of communication protocols for the provision of the applications 610, such as the Remote Desktop Protocol (RDP) or the Independent Computing Architecture (ICA), among others.

To initiate, the session manager 525 may provide, send, or otherwise transmit a request for the session 605 to the appliance 200 or the connector 510 at the same site 505 as the appliance 200 via the network 104. In some embodiments, when the request is received by the appliance 200, the appliance 200 may send or forward the request to the connector 510. In some embodiments, the request may identify the one or more applications 610 to be accessible to the client 102. In some embodiments, the request may also identify or include authentication credentials for the user of the client 102, such as an account identifier and a passcode, among others. For example, when requesting for the provision of a session, the user may enter in the authentication credentials on a graphical user interface (GUI) provided by the agent 520 on the client 102 via one or more input/output (I/O) devices. Upon entry, the session manager 525 may generate the request to send to the connector 510.

With the receipt of the request, the connector 510 may find, identify, or select a delivery agent (DA) 515 (sometimes herein referred to as a virtual delivery agent) for the session 605 to provide the client 102 access to the applications 610. The connector 510 may parse the request to identify or extract the authentication credentials, including the account identifier and the passcode. Based on the identification of the user, the connector 510 may authenticate and verify the user using the authentication credentials (e.g., the passcode). Upon successful authentication, the connector 510 may identify the one or more applications 610 that the user is to be provided access to. For example, the connector 510 may access a list of applications 610 defined by an enterprise and maintained by the appliance 200 for the particular user. From the list, the connector 510 may extract or determine which applications 610 are to be provided to the user. In some embodiments, the connector 510 may parse the request to identify the applications 610 indicated in the request itself.

Using the identification of the applications 610, the connector 510 may select the delivery agent 515 from the set of delivery agents 515 managed by the connector 510. Independent of the request, the connector 510 may handle, interface with, or manage the set of delivery agents 515 at the site 505 of the appliance 200. At the time of receipt of the request, the connector 510 may identify available delivery agents 515. There may be no delivery agents 515 available or in active state or one or more delivery agent 515 available and in an active state at the site 505. When there are no delivery agents 515, the connector 510 may create, launch, or otherwise instantiate the delivery agent 515 for the session 605. The delivery agent 515 may be instantiated to include or provide access to the identified applications 610. If there are multiple available delivery agents 515, the connector 510 may select the delivery agent 515 through which the applications 610 are accessible for the session 605.

With the selection, the connector 510 may set, assign, or otherwise use the delivery agent 515 for the session 605 over the network 104. The delivery agent 515 may interface or facilitate communications with the servers 106 to provide the client 102 access to the applications 610 for the session 605. In some embodiments, the connector 510 may invoke the delivery agent 515 to provide at least one virtual desktop 615. The virtual desktop 615 may be a part of a physical or virtual machine (e.g., the virtual machine 306), and may be a graphical user interface (GUI) to facilitate accessing of the applications 610 for the session 605. For example, the virtual desktop 615 may be a desktop environment for an operating system on the virtual machine to be provided for the session 605. In some embodiments, the connector 510 may modify, configure, or otherwise set the virtual desktop 615 of the delivery agent 515 to provide access to the requested applications 610. The provision of the virtual desktop 615 may correspond to a completion of the establishment of the session 605 between the client 102 and the connector 510 over the network 104.

With the establishment of the session 605, a user of the client 102 may access one or more the applications 610 available through the delivery agent 515. The delivery agent 515 of the connector 510 may monitor for requests to access the applications 610 and other resources hosted on the servers 106 from the agent 520 on the client 102. The request may correspond to an interaction or event on the virtual desktop 615 provided for the session 605. For instance, using an I/O device of the client 102, the user may interact with an icon presented in the virtual desktop 615 to launch the corresponding application 610. Upon detecting the interaction, the delivery agent 515 may communicate with the server 106 hosting resources for the application 610. From interfacing with the server 106, the delivery agent 515 may generate and provide an output in response to the request via the session 605. For example, the delivery agent 515 may cause a GUI for the application 610 to be displayed in an area of the virtual desktop 615. The connector 510 may facilitate and handle communications on between the servers 106 and the client 102 for the delivery agent 515.

While the session 605 is in use, the network monitor 530 executing on the client 102 may check, keep track, or otherwise monitor for network conditions between the client 102 and the servers 106 via the connector 510. To monitor, the network monitor 530 may aggregate, obtain, or otherwise identify a set of metrics 620A-X (hereinafter generally referred to as metrics 620) on the network conditions between the client 102 and the connector 510 with which the session 605 is established. Each metric 620 may be a measure of the network condition in the network 104 via which the session 605 between the client 102 and connector 510. The set of metrics 620 may identify or include, for example, latency, packet loss, bandwidth, jitter, and throughput, among others. The latency may indicate a time elapsed in communicating data or packet between the client 102 and the connector 510. The packet loss may indicate a rate or percentage at which packets communicated between the client 102 and the connector 510 that fail to reach a destination corresponding to one of the client 102 and the connector 510. The bandwidth may correspond to an amount of data capable of communication over a period of time between the client 102 and the connector 510 over the session 605. The jitter may refer to a variation in delay of packets communicated between the client 102 and the connector 510. The throughput may identify an amount of data that is communicated between the client 102 and the connector 510 over a period of time.

In some embodiments, the network monitor 530 may calculate, derive, or otherwise determine the metrics 620 from the communications between the client 102 and the connector 510. The determination of the metrics 620 may in accordance with a network instrumentation tool. For example, the network monitor 530 may use pinging to determine the latency and packet loss. The pinging may involve the client 102 sending of echo request packets to the connector 510 and waiting for responses from the connector 510. Based on the response packets, the network monitor 530 may determine the latency and packet. For bandwidth, jitter, and throughput, the network monitor 530 may use an instrumentation tool (e.g., iperf) to measure the network conditions between the client 102 and the connector 510. The instrumentation tool may communicate a stream of packets between the client 102 and the connector 510. From the receipt of the stream of packets, the network monitor 530 can determine the bandwidth, jitter, and throughput.

In addition, the network monitor 530 may aggregate, obtain, or otherwise identify a set of metrics 620'A-X-1 to 620'A-X-N (hereinafter generally referred to as metrics 620') on the network conditions between the connector 510 and each server 106. The servers 106 may host the resources for the applications 610 accessed via the session 605 by the client 102. In some embodiments, the network monitor 530 may provide, send, or otherwise transmit a request for metrics to the connector 510. In some embodiments, the request may identify the servers 106 hosting the resources for the applications 610 accessed by the client 102 over the session 605. Upon receipt, the connector 510 may identify the servers 106 associated with the applications 610 accessible via the session 605 to the client 102. There may be some servers 106 associated with the applications 610 and other servers 106 that are not accessed or accessible via the session 605. In some embodiments, the connector 510 may parse the request to identify the servers 106 hosting the resources for the application 610. With the identification, the connector 510 may measure, determine, or otherwise identify the set of metrics 620 between the connector 510 and each server 106 identified as associated with the session 605 for the client 102.

The metrics 620' on the network conditions between the connector 510 and the respective server 106, similar to the metrics 620 on the network conditions between the client 102 and the connector 510. The set of metrics 620' may identify or include, for example, latency, packet loss, bandwidth, jitter, and throughput, among others. The latency may indicate a time elapsed in communicating data or packet between the connector 510 and the respective server 106. The packet loss may indicate a rate or percentage at which packets communicated between the connector 510 and the respective server 106 that fail to reach a destination corresponding to one of the connector 510 and the respective server 106. The bandwidth may correspond to an amount of data capable of communication over a period of time between the connector 510 and the respective server 106 over the session 605. The jitter may refer to a variation in delay of packets communicated between the connector 510 and the respective server 106. The throughput may identify an amount of data that is communicated between the connector 510 and the respective server 106 over a period of time.

In some embodiments, the connector 510 may calculate, derive, or otherwise determine the metrics 620' in a similar manner as the network monitor 530 in determining the metrics 620. The determination of the metrics 620' may in accordance with a network instrumentation tool. For example, the network monitor 530 may use pinging to determine the latency and packet loss. The pinging may involve the connector 510 sending of echo request packets to the respective server 106 and waiting for responses from the respective server 106. Based on the response packets, the network monitor 530 may determine the latency and packet. For bandwidth, jitter, and throughput, the network monitor 530 may use an instrumentation tool (e.g., iperf) to measure the network conditions between the connector 510 and the respective server 106. The instrumentation tool may communicate a stream of packets between the connector 510 and the respective server 106. From the receipt of the stream of packets, the network monitor 530 can determine the bandwidth, jitter, and throughput. With the determination, the connector 510 may return, send, or otherwise transmit the set of metrics 620' between the connector 510 and each of the servers 106 identified as associated with the session 605 to the client 102.

With the identification, the quality evaluator 535 executing on the client 102 may apply or perform one or more data preparation on the sets of metrics 620 and 620'. The data preparation may include, for example, conversion to a comparable values, scaling, and normalization, among others. In some embodiments, the quality evaluator 535 may convert, adjust, or otherwise set the value of each metric 620 and 620' to a comparable value. The setting to the comparable value may be to change the value of all metrics 620 and 620' (e.g., the latency, packet loss, bandwidth, jitter, and throughput) to within a range of numerical values, such as −1 to 1, 0 to 1, or 0 to 100, among others. For example, the quality evaluator 535 may convert the value for latency from 13 seconds to a scalar value of 0.0769 (1/13) without any units and the value of the packet loss from 14% to a scalar value of 0.0714 (1/14) also without any units.

Within each set of the metrics 620 or 620', the quality evaluator 535 may apply or use at least one value of the metrics 620 or 620' to normalize or scale each metric 620 or 620' in the set. The scaling may be in accordance with a function, such as a min-max normalization, mean normalization, Z-score normalization, or scaling to unit length, among others. The scaling may be applied to the values of the metrics 620 or 620', with the conversion to the comparable values. In some embodiments, within each set of metrics 620 or 620', the quality evaluator 535 may use a minimum value and a maximum value to scale each metric 620 or 620' in the set. For instance, the quality evaluator 535 may apply a min-max normalization of the following form:

$$x' = \frac{x - \min(x)}{\max(x) - \min(x)}$$

where x is one of the metrics 620 or 620' in the set (e.g., the latency, packet loss, bandwidth, jitter, and throughput), min(x) is a minimum value of the set of metrics 620 or 620', max(x) is a maximum value of the metrics 620 or 620', and x' is the rescaled value of the corresponding metric 620 or 620'.

The quality evaluator 535 may calculate, generate, or otherwise determine at least one score 625 (sometimes herein referred to as a fluency or a fluency score) for the connector 510. The score 625 may indicate or measure an objective measure of the network quality between the client 102 and the connector 510. The determination of the score 625 by the quality evaluator 535 may be a function of the set of scaled metrics 620 for the network conditions between the client 102 and the connector 510. The function may include, for example, an average, a weighted average, a geometric mean, a harmonic mean, or a central tendency, among others. For instance, the function used by the quality evaluator 535 may be a weighted average of the form:

$$T_{i\_score} = 0.2 * (X_{i\_latency} + X_{i\_loss} + X_{i\_bandwidth} + X_{i\_jitter} + X_{i\_throughput})$$

wherein X is a scaled metric 620 of the set, such as the latency, packet loss, bandwidth, jitter, and throughput. In accordance with the function, the quality evaluator 535 may determine the score 625 for the connector 510.

In addition, the quality evaluator 535 may calculate, generate, or otherwise determine at least one score 625'A-N (hereinafter generally referred to scores 625') for each server 106. The score 625' may be for each server 106 associated with the application 610 accessible via the session 605. The score 625' may indicate or a measure an objective measure of the network quality between the connector 510 and the respective server 106. The determination of the score 625' by the quality evaluator 535 may be a function of the set of scaled metrics 620 for the network conditions between the connector 510 and each respective server 106. The function used by the quality evaluator 535 to determine the score 625' may be of the same form (e.g., a weighted average) as above for the score 625. In accordance with the function, the quality evaluator 535 may determine the score 625' for each server 106. The quality evaluator 535 may repeat the determination of the score 625' for each of the servers 106 accessible to the client 102 via the session 605.

With the determination of the scores 625' for each server 106, the quality evaluator 535 may identify or select at least one score 625'. In selecting, the quality evaluator 535 may compare the score 625' for each server 106 with one another. Based on the comparison, the quality evaluator 535 may select the worst score 625' from the set of scores 625' for the servers 106. In addition, the quality evaluator 535 may identify the server 106 with the worst score 625'. For example, the quality evaluator 535 may select the score 625' with the lowest in scalar value. The worst score 625' may be identified for use in determining the overall network quality for the session 605. The worst score 625' may be selected, because the server 106 associated with the worst score 625' will delineate or limit the network quality for the overall session 605 and by extension the experience of the user of the client 102.

The quality evaluator 535 may calculate, generate, or otherwise determine at least one network quality score 630 (sometimes herein referred to as an overall fluency or overall fluency score) for the session 605. The determination of the network quality score 630 may be based on the score 625 for the connector 510 and the selected score 625'. The network quality score 630 may indicate an objective measure of the network quality and user experience with respect to the session 605 as determined from the metrics 620 and 620' between the client 102 and the servers 106. The quality evaluator 535 may determine the network quality score 630 in accordance with a function. The function may include, for example, an average, a weighted average, a geometric mean, a harmonic mean, or a central tendency, among others. For instance, the function applied to the scores 625 and 625' by the quality evaluator 535 may be of the following form:

$$T_{j\_score} = \min(T_{j\_score\_local\_to\_session} + T_{j\_score\_session\_to\_remote})$$

where $T_{j\_score\_local\_to\_session}$ denotes the score 625 for the connector 510 and $T_{j\_score\_session\_to\_remote}$ denotes the score 625' for a respective server 106. In the function of the example above, the quality evaluator 535 may determine a sum of the score 625 for the connector 510 and the score 625' for each respective server 106. Upon determination of the sums, the quality evaluator 535 may identify the minimum sum of the scores 625 and 625' as the network quality score 630.

Using the network quality score 630, the quality evaluator 535 may determine whether the network conditions for the session 605 are satisfactory. To determine, the quality evaluator 535 may compare the network quality score 630 with a threshold. The threshold may delineate or identify a value for the network quality score 630 at which the network conditions for the session 605 is determined to be satisfactory or unsatisfactory.

When the network quality score 630 satisfies (e.g., greater than or equal to) the threshold, the quality evaluator 535 may determine that the network condition is satisfactory. The quality evaluator 535 may continue with the session 605 between the client 102 and the connector 510. The agent 520 on the client 102 may continue to maintain and use the virtual desktop 615 to access one or more of the applications 610. In contrast, when the network quality score 630 does not satisfy (e.g., less than) the threshold, the quality evaluator 535 may determine that the network condition is not satisfactory. The quality evaluator 535 may further determine to identify a new connector 510 to which to switch the session 605. The quality evaluator 535 may also invoke the network monitor 530 in performing the determination. Until the identification and selection of the new connector 510, the agent 520 on the client 102 may continue to maintain the session 605 and use the virtual desktop 615 to access one or more of the applications 610.

Figure 7A:
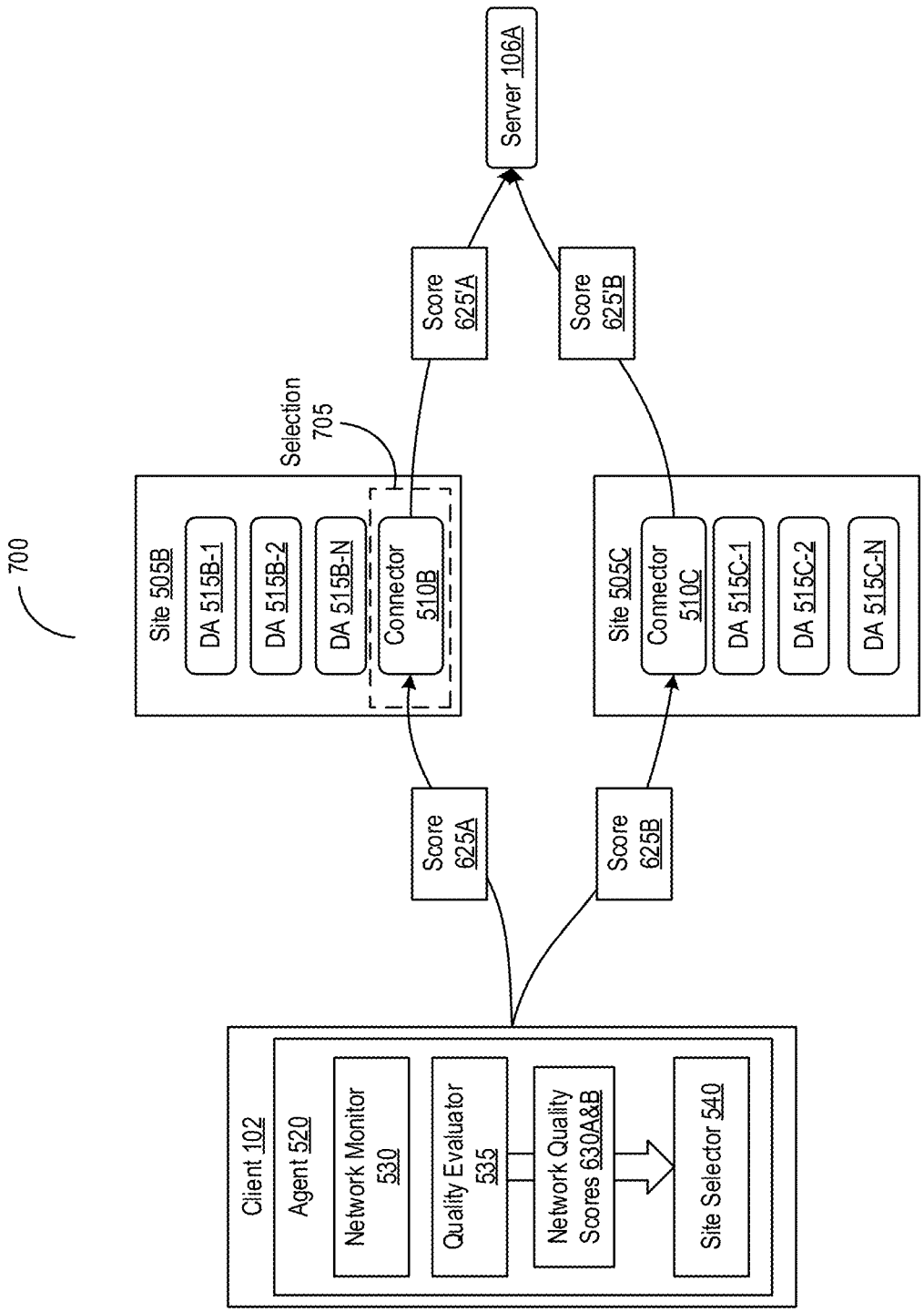
FIG. 7A is a block diagram of an embodiment of a process for determining network condition scores with a single service in the system for establishing session, in accordance with an illustrative embodiment.

Referring now to FIG. 7A, depicted is a block diagram of a process 700 for determining network condition scores with a single service in the system 500. The process 700 may correspond to operations performed in the system 500 for identifying a new connector to which to switch to, when there is a single service to be accessed by the client. The process 700 may be a continuation of the process 600 detailed above. Under the process 700, the network monitor 530 may find, select, or otherwise identify one or more candidate connectors 510 (e.g., the connectors 510B and 510C as depicted) to which to connect to. The candidate connectors 510 may be active, enable, or otherwise available for connection with the client 102. The connection may be over the same network 104 as the connector 510 with which the client 102 has established the session 605 or over a different network 104.

In some embodiments, the network monitor 530 may broadcast, send, or otherwise transmit a discovery signal to identify the candidate connectors 510. The discovery signal may identify the applications 610 accessed or accessible in the session 605. In some embodiments, the discovery signal may also identify the user of the agent 520 on the client 102. In some embodiments, the network monitor 530 may transmit the discovery signal to each appliance 200. When the discovery signal is received, the corresponding appliance 200 may forward or provide the discovery signal to at least one connector 510 at the same site 505 as the appliance 200.

Upon receipt of the discovery signal, each recipient candidate connector 510 may identify or determine whether the candidate connector 510 is available for a connection with the client 102. The determination may be based on the availability of delivery agents 515 accessible to the respective candidate connector 510 or otherwise at the same site 505 as the candidate connector 510. In some embodiments, the candidate connector 510 may parse the discovery signal to identify the user of the client 102. The parsing may be when the candidate connector 510 is active or enabled. When the candidate connector 510 is not active or enabled, the candidate connector 510 may ignore or may not respond to the discovery signal. Based on the identification of the user, the connector 510 may identify the one or more applications 610 that the user is to be provided access to. In some embodiments, the candidate connector 510 may parse the discovery signal to identify the applications 610 provided in the session 605 indicated in the discovery signal itself.

To determine whether the candidate connector 510 is available, the recipient connector 510 may interface, probe, or otherwise access each delivery agent 515 to identify whether the delivery agent 515 is in the active state (or free for use by the client 102). For each delivery agent 515 identified as active, the connector 510 may determine whether the delivery agent 515 provides the applications 610 that are accessible in the session 605. When there is at least one delivery agent 515 determined to provide the applications 610, the candidate connector 510 may determine that the candidate connector 510 is available. The candidate connector 510 may also return, send, or otherwise transmit a response indicating that the candidate connector 510 (or site 505) is available to the client 102.

On the other hand, when there are no delivery agents 515, the candidate connector 510 may determine whether the associated site 505 is at capacity. From interfacing, the candidate connector 510 may count or determine a number of delivery agents 515 that are in the active state. The candidate connector 510 may compare the number of active delivery agents 515 to a threshold. The threshold may identify the maximum number of delivery agents 515 supportable at the site 505. If the number of active delivery agents 515 is greater than or equal to the threshold, the candidate connector 510 may determine that the site 505 is at capacity and may identify the candidate connector 510 as unavailable. The candidate connector 510 may return, send, or otherwise transmit a response indicating that the candidate connector 510 is unavailable to the client 102. In contrast, if the number of active delivery agents 515 is less than the threshold, the candidate connector 510 may determine that the site 505 has excess capacity. The candidate connector 510 may also identify that the candidate connector 510 is available. The candidate connector 510 may return, send, or otherwise transmit a response indicating that the candidate connector 510 is available to the client 102.

Using the responses from the candidate connectors 510, the network monitor 530 may identify the candidate connectors 510 to which to switch the connection. In some embodiments, the network monitor 530 may parse each response upon receipt to determine whether the corresponding candidate connector 510 is available or unavailable. When the response indicates that the candidate connector 510 is available, the network monitor 530 may determine that the candidate connector 510 from which the response is received is available. Conversely, when the response indicates that the candidate connector 510 is unavailable, the network monitor 530 may determine that the candidate connector 510 is unavailable. Furthermore, if no response is received from a connector 510, the network monitor 530 may identify the connector 510 as not a candidate for a new connection.

With the identification, the network monitor 530 may aggregate, obtain, or otherwise identify a set of metrics 620 on the network conditions between the client 102 and each candidate connector 510 (e.g., the connectors 510B and 510C as depicted). The identification of the metrics 620 may be as similar as detailed above in the process 600. Each metric 620 may be a measure of the network condition in the network 104 (or another network 104) between the client 102 and the respective connector 510. The set of metrics 620 may identify or include, for example, latency, packet loss, bandwidth, jitter, and throughput, among others. In some embodiments, the network monitor 530 may calculate, derive, or otherwise determine the metrics 620 from the communications between the client 102 and the connector 510. The determination of the metrics 620 may in accordance with a network instrumentation tool as detailed above.

In addition, for each candidate connector 510, the network monitor 530 may aggregate, obtain, or otherwise identify a set of metrics 620' on the network conditions between the candidate connector 510 and a respective server 106. In the depicted example, the network monitor 530 may determine the set of metrics 620' in relation to a single server 106 of a single function type (e.g., the server 106A). The server 106 may host, facilitate, or otherwise provide resources for a corresponding application 610, and may be situated at a particular physical location. For example, the server 106A may host resources for an electronic mail agent and may be located in London, UK. The identification of the metrics 620' may be as similar as detailed above in the process 600. Each metric 620' may be a measure of the network condition between the respective candidate connector 510 and the server 106. The set of metrics 620' may identify or include, for example, latency, packet loss, bandwidth, jitter, and throughput, among others. In some embodiments, the network monitor 530 may calculate, derive, or otherwise determine the metrics 620' from the communications between the connector 510 and the server 106. The determination of the metrics 620' may in accordance with a network instrumentation tool as detailed above.

With the identification, the quality evaluator 535 executing on the client 102 may apply or perform one or more data preparation on the sets of metrics 620 and 620'. The data preparation applied to the metrics 620 and 620' may be similar as detailed above under the process 600, and may include, for example, conversion to a comparable values, scaling, and normalization, among others. Furthermore, upon conversion, the quality evaluator 535 may apply or use at least one value of the metrics 620 or 620' to normalize or scale each metric 620 or 620' within each set of the metrics 620 or 620'. The scaling may be similar as detailed above in the process 600, and may be in accordance with a function, such as a min-max normalization, mean normalization, Z-score normalization, or scaling to unit length, among others.

The quality evaluator 535 may calculate, generate, or otherwise determine at least one score 625 for each candidate connector 510. The determination of the score 625 may be similar as detailed above under the process 600. The quality evaluator 535 may determine the score 625 a function of the set of scaled metrics 620 for the network conditions between the client 102 and the respective candidate connector 510. In the depicted example, the quality evaluator 535 may determine a first score 625A for the connector 510B using the set of scaled metrics 620 for the network conditions between the client 102 and the connector 510B. The quality evaluator 535 may determine a second score 625B for the connector 510C using the set of scaled metrics 620 for the network conditions between the client 102 and the connector 510C.

Furthermore, the quality evaluator 535 may calculate, generate, or otherwise determine at least one score 625' for the server 106. The determination of the score 625' may be similar as detailed above under the process 600. The quality evaluator 535 may determine the score 625' a function of the set of scaled metrics 620' for the network conditions between the respective candidate connector 510 and the server 106. In the depicted example, the quality evaluator 535 may determine a first score 625'A for the first server 106A using the set of scaled metrics 620' for the network conditions between the candidate connector 510B and the first server 106A. The quality evaluator 535 may determine a second score 625B for the first server 106A using the set of scaled metrics 620' for the network conditions between the candidate connector 510C and the first server 106A. Without a single server 106 (e.g., the first server 106A), the quality evaluator 535 may refrain from or may not select scores 625' among the servers 106 as in the process 600 detailed above.

The quality evaluator 535 may calculate, generate, or otherwise determine at least one network quality score 630 for each candidate connector 510. The determination of the network quality score 630 may be based on the score 625 for the connector 510 and the score 625' for the server 106 (e.g., the first server 106A) as detailed above under the process 600. The network quality score 630 may indicate a predicted, objective measure of the network quality and user experience with respect to a potential session between the client 102 and the respective candidate connector 510. In the depicted example, the quality evaluator 535 may determine a network quality score 630A for the candidate connector 510B using the scores 625A and 625'A. The network quality score 630A may indicate the predicted measure of network quality with respect to a yet-to-be established session between the client 102 and the candidate connector 510B. The quality evaluator 535 may determine a network quality score 630B for the candidate connector 510C using the scores 625B and 625'B. The network quality score 630B may indicate the predicted measure of network quality with respect to yet-to-be established session between the client 102 and the candidate connector 510C.

Using the determination of the network quality scores 630 (e.g., the network quality scores 630A and 630B), the site selector 540 executing on the client 102 may perform a selection 705 of at least one of the candidate connectors 510 for connecting with the client 102. In some embodiments, the site selector 540 may find, identify, or otherwise select one of the candidate connectors 510 based on at least one of the network quality scores 630. To select, the site selector 540 may compare the network quality scores 630 for the candidate connectors 510 with one another. From comparing, the site selector 540 may select the candidate connector 510 with the best network quality score 630. In the depicted example, from performing the selection 705, the site selector 540 may identify the connector 510B as having the highest value for the network quality score 630A. The site selector 540 may select from the set of candidate connectors 510 in accordance with a formula of the following form:

$$T_{final\_score} = \max\left(\sum_{i=0}^{N} T_{i\_score}\right)$$

where $T_{final\_score}$ denotes the best network quality score 630, $T_{i\_score}$ denotes the network quality scores 630 for the candidate connectors 510, and N denotes the number of candidate connectors 510. With the selection, the site selector 540 may find or identify an identifier for the connector 510. The identifier may be, for example, an alphanumeric identifier or a network address, such as an Internet Protocol (IP) address or a media access control (MAC) address, among others, uniquely referencing the connector 510 of the selection 705.

Figure 7B:
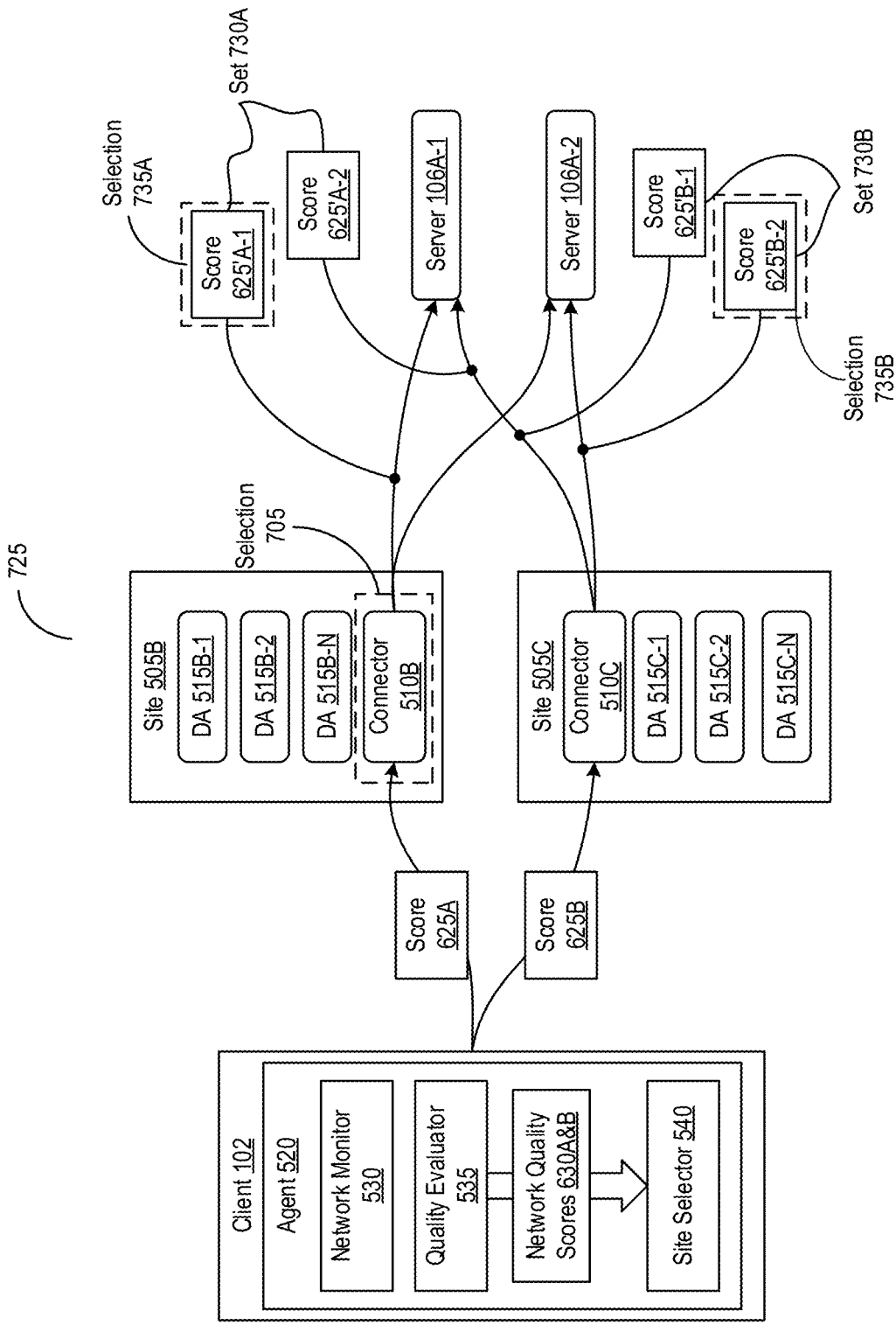
FIG. 7B is a block diagram of an embodiment of a process for determining network condition scores with multiple services of a single type in the system for establishing session, in accordance with an illustrative embodiment.

Referring now to FIG. 7B, depicted is a block diagram of a process 725 for determining network condition scores with multiple services of a single type in the system 500. The process 725 may correspond to operations performed in the system 500 for identifying a new connector to which to switch to, when there are multiple servers providing resources for a single application to be accessed by the client. The process 725 may be a variation on the process 700 in that there are servers 106 (e.g., the servers 106A-1 and 106A-2 as depicted) associated with the same application 610. For example, the servers 106A-1 and 106A-2 each may host resources for a particular application 610 and thus of the same function type. Furthermore, each server 106A-1 and 106A-2 may independently provide the resources for a given session between the connector 510 and the client 102. The servers 106A-1 and 106A-2 may be a different physical location. For example, the server 106A-1 may be situated in San Jose, Calif. and the server 106A-2 may be located in Raleigh, N.C. Under the process 725, the operations performed by the network monitor 530 in finding candidate connectors 510 (e.g., the connectors 510B and 510C as depicted) and aggregating the sets of metrics 620 between the client 102 and each connector 510 may be similar to the operations performed by the network monitor 530 under process 700.

Continuing on, for each candidate connector 510, the network monitor 530 may aggregate, obtain, or otherwise identify a set of metrics 620' on the network conditions between the candidate connector 510 and each server 106 (e.g., the server 106A-1 and 106A-2). In the depicted example, the network monitor 530 may identify at least four sets in total: a set of metrics 620' for network condition between the connector 510B and the server 106A-1; a set of metrics 620' for network condition between the connector 510B and the server 106A-2; a set of metrics 620' for network condition between the connector 510C and the server 106A-1; and a set of metrics 620' for network condition between the connector 510C and the server 106A-2. Each metric 620' may be a measure of the network condition between the respective candidate connector 510 and the server 106. The set of metrics 620' may identify or include, for example, latency, packet loss, bandwidth, jitter, and throughput, among others. In some embodiments, the network monitor 530 may calculate, derive, or otherwise determine the metrics 620' from the communications between the connector 510 and the server 106. The determination of the metrics 620' may in accordance with a network instrumentation tool as detailed above.

With the identification, the quality evaluator 535 executing on the client 102 may apply or perform one or more data preparation on the sets of metrics 620 and 620'. The data preparation applied to the metrics 620 and 620' may be similar as detailed above under the process 600, and may include, for example, conversion to a comparable values, scaling, and normalization, among others. Furthermore, upon conversion, the quality evaluator 535 may apply or use at least one value of the metrics 620 or 620' to normalize or scale each metric 620 or 620' within each set of the metrics 620 or 620'. The scaling may be similar as detailed above in the process 600, and may be in accordance with a function, such as a min-max normalization, mean normalization, Z-score normalization, or scaling to unit length, among others.

The quality evaluator 535 may calculate, generate, or otherwise determine at least one score 625 for each candidate connector 510. The determination of the score 625 may be similar as detailed above under the process 600. The quality evaluator 535 may determine the score 625 a function of the set of scaled metrics 620 for the network conditions between the client 102 and the respective candidate connector 510. In the depicted example, the quality evaluator 535 may determine a first score 625A for the connector 510B using the set of scaled metrics 620 for the network conditions between the client 102 and the connector 510B. The quality evaluator 535 may determine a second score 625B for the connector 510C using the set of scaled metrics 620 for the network conditions between the client 102 and the connector 510C.

Furthermore, the quality evaluator 535 may calculate, generate, or otherwise determine a set of scores 625' for each server 106. The determination of each of the scores 625' may be similar as detailed above under the process 600. The quality evaluator 535 may determine each score 625' a function of the set of scaled metrics 620' for the network conditions between the respective candidate connector 510 and the respective server 106. A single set of scores 625' may be calculated based on the metrics 620' between on candidate connector 510 and respective servers 106. In the depicted example, the quality evaluator 535 may determine at least four scores: a score 625'A-1 using the set of metrics 620' between the connector 510B and the server 106A-1; a score 625'A-2 using the set of metrics 620' for network condition between the connector 510B and the server 106A-2; a score 625'B-1 using the set of metrics 620' between the connector 510C and the server 106A-1; and a score 625'B-2 using the set of metrics 620' for network condition between the connector 510C and the server 106A-2. The quality evaluator 535 may determine a set of scores 625' for each candidate connector 510 with respect to the servers 106A-1 and 106A-2. In this example, the quality evaluator 535 may determine a set of scores 730A including the scores 625'A-1 and 625'A-2 associated with the connector 510B. Furthermore, the quality evaluator 535 may determine a set of scores 730B including the scores 625'A-1 and 625'A-2 associated with the connector 510C.

With the determination of the set of scores 625' (e.g., the sets 730A and 730B) for each server 106, the quality evaluator 535 may identify or select at least one score 625' from the set of scores 625' for the servers 106 with respect to each candidate connector 510. In selecting, for each candidate connector 510, the quality evaluator 535 may determine or other identify whether the servers 106 are of a same function type or a different type. To identify, the quality evaluator 535 may obtain, determine, or otherwise identify a function type of each server 106. The function type may be identified based on the application 610 that the server 106 is associated with. For example, the quality evaluator 535 may identify that the application 610 whose resources are hosted on each server 106, and use the identification of the application 610 as the function type for the respective server 106. In some embodiments, the quality evaluator 535 may request for the function type from each server 106. For instance, the quality evaluator 535 may send a request for the application 610 associated with the resources hosted on the server 106. The server 106 in turn may return a response indicating the function type.

According to the function types of the servers 106, the quality evaluator 535 may select the score 625' from the set of scores 625' (e.g., the sets 730A and 730B) for the servers 106 with respect to each candidate connector 510. The quality evaluator 535 may compare the function types of the servers 106 with one another. Based on the comparison, the quality evaluator 535 may identify that the servers 106 are of the same function type. In the depicted example, the quality evaluator 535 may determine that the servers 106A-1 and 106A-2 are of the same type, as these two servers 106A-1 and 106A-2 facilitate the functions of the same application 610.

When the servers 106 are identified as of the same function type, the quality evaluator 535 may identify or select the best score 625' from the set of scores 625' with respect to each candidate connector 510. In addition, the quality evaluator 535 may select or identify the server 106 with the best score 625' with respect to each candidate connector 510 for the connection between the candidate connector 510 and the client 102. In some embodiments, the quality evaluator 535 may identify an identifier for the server 106 with the best score 625'. The identifier for the server 106 may be an alphanumeric identifier or a network address referencing the server 106. In the depicted example, the quality evaluator 535 may perform a selection 735A of the score 625'A-1 from the set 730A between the connector 510B and the two servers 106A-1 and 106A-2. The quality evaluator 535 may select the server 106A-1 associated with the score 625'A-1 for the connection between the connector 510B and the client 102. Furthermore, the quality evaluator 535 may perform a selection 735B of the score 625'B-2 from the set 730B between the connector 510C and the two servers 106A-1 and 106A-2. The quality evaluator 535 may identify the server 106A-2 as associated with the score 625'B-2 for the connection between the connector 510C and the client 102. In each case, the scalar values of the scores 625'A-1 and 625'B-2 may be the highest in the respective sets 730A and 730B. For the same function type, the best score 625' may be selected, as the connector 510 is to access resources on the server 106 with the highest performance on behalf of the client 102.

The quality evaluator 535 may calculate, generate, or otherwise determine at least one network quality score 630 for each candidate connector 510. The determination of the network quality score 630 may be based on the score 625 for the connector 510 and the selected score 625' for the server 106. The determination of the network quality score 630 may be calculated in a similar manner as discussed above, for example, as a weighted average of scores 625 and 625' determined from scaled metrics 620 and 620' respectively. The network quality score 630 may indicate a predicted, objective measure of the network quality and user experience with respect to a potential session between the client 102 and the respective candidate connector 510. In the depicted example, the quality evaluator 535 may determine a network quality score 630A for the candidate connector 510B using the score 625A and the score 625'A-1 for the selected server 106A-1. The quality evaluator 535 may determine a network quality score 630A for the candidate connector 510C using the score 625B and the score 625'B-2 for the selected server 106A-2.

Using the determination of the network quality scores 630 (e.g., the network quality scores 630A and 630B), the site selector 540 executing on the client 102 may perform a selection 705 of at least one of the candidate connectors 510 for connecting with the client 102. In some embodiments, the site selector 540 may find, identify, or otherwise select one of the candidate connectors 510 based on at least one of the network quality scores 630. To select, the site selector 540 may compare the network quality scores 630 for the candidate connectors 510 with one another. From comparing, the site selector 540 may select the candidate connector 510 with the best network quality score 630. In the depicted example, from performing the selection 705, the site selector 540 may identify the connector 510B as having the highest value for the network quality score 630A.

Figure 7C:
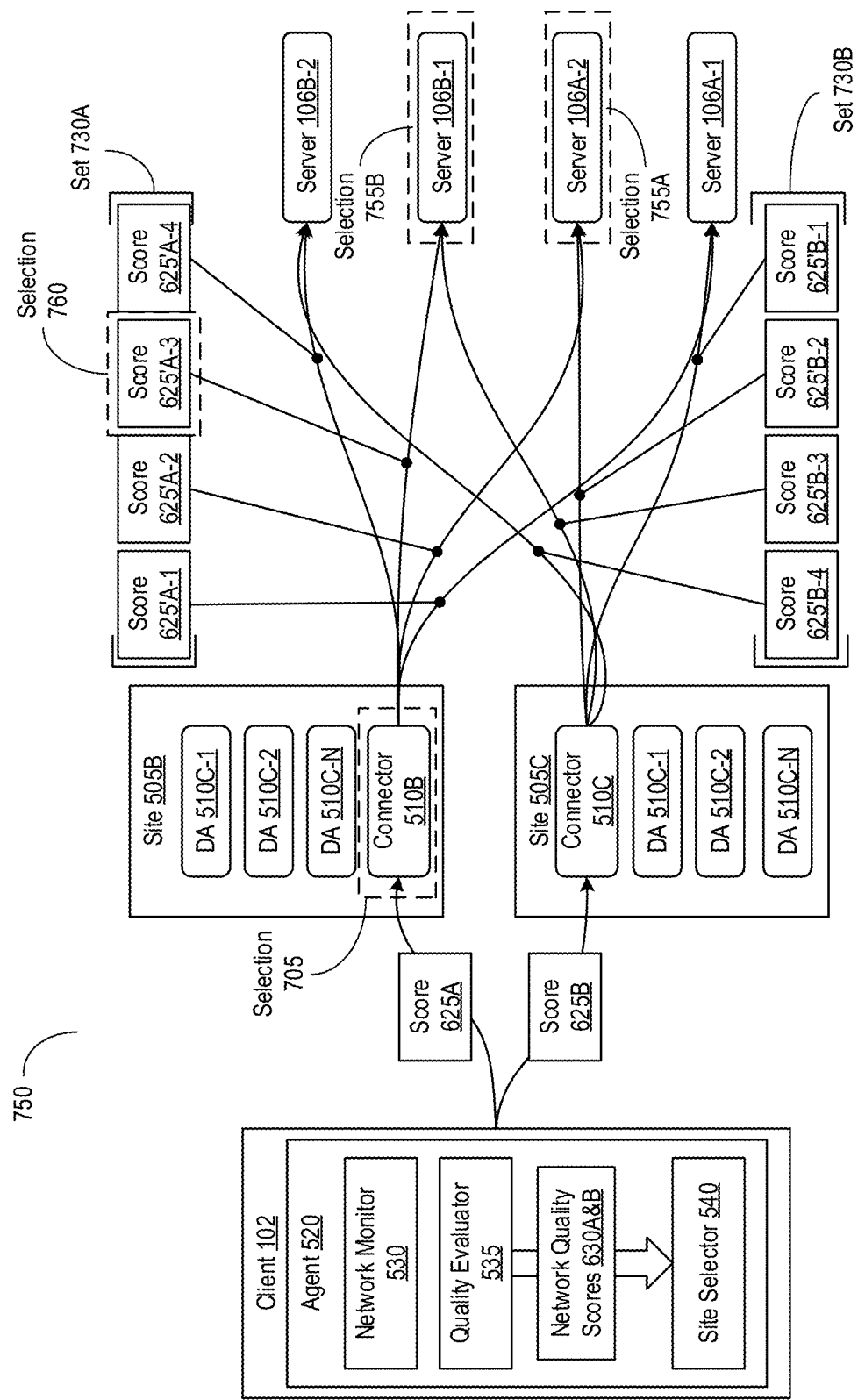
FIG. 7C is a block diagram of an embodiment of a process for determining network condition scores with multiple services of multiple types in the system for establishing session, in accordance with an illustrative embodiment.

Referring now to FIG. 7C is a block diagram of a process 750 for determining network condition scores with multiple services of multiple types in the system 500. The process 750 may correspond to operations performed in the system 500 for identifying a new connector to which to switch to, when there are multiple servers providing resources for multiple types of applications. The process 750 may be a variation on the process 725 and by extension process 700, in that there are multiple servers 106 (e.g., the servers 106A-1, 106A-2, 106B-1, and 106B-2 as depicted) associated with the difference application 610. In the depicted example, the servers 106A-1 and 106A-2 each may host resources for a particular application 610 and thus be of the same function type. Furthermore, each server 106A-1 and 106A-2 may independently provide the resources for a given session between the connector 510 and the client 102. Conversely, the servers 106B-1 and 106B-2 each may host resources for another application 610, and may thus be of a function type different from the function type for the servers 106A-1 and 106A-2. The servers 106A-1, 106A-2, 106B-1, and 106B-2 may be a different physical location. For example, the server 106A-1 may be situated in Alexandria, Va., the server 106A-2 may be located in London, UK, the server 106B-1 may be located in Shanghai, China, and the server 106B-2 may be located in Miami, Fla.

Under the process 750, the operations performed by the network monitor 530 in finding candidate connectors 510 (e.g., the connectors 510B and 510C as depicted) and aggregating the sets of metrics 620 between the client 102 and each connector 510 may be similar to the operations performed by the network monitor 530 under process 700 and 725. Furthermore, the operations performed by the network monitor 530 in determining the scores 625 and 625' may be similar to the operations performed by the network monitor 530 under the process 725. In the depicted example, the quality evaluator 535 may determine at least eight scores 625' using the metrics 620' on the network conditions between the candidate connector 510 and each server 106.

With respect to the connector 510B, the quality evaluator 535 may determine: a score 625'A-1 using the set of metrics 620' between the connector 510B and the server 106A-1; a score 625'A-2 using the set of metrics 620' for network condition between the connector 510B and the server 106A-2; a score 625'A-3 using the set of metrics 620' between the connector 510B and the server 106B-1; a score 625'A-4 using the set of metrics 620' for network condition between the connector 510B and the server 106B-2. The scores 620'A-1, 620'A-2, 620'A-3, and 620'A-4 may belong to a set 730A associated with the connector 510B. Likewise, with respect to the connector 510C, the quality evaluator 535 may determine: a score 625'B-1 using the set of metrics 620' between the connector 510C and the server 106A-1; a score 625'B-2 using the set of metrics 620' for network condition between the connector 510C and the server 106A-2; a score 625'B-3 using the set of metrics 620' between the connector 510C and the server 106B-1; and a score 625'B-4 using the set of metrics 620' for network condition between the connector 510C and the server 106B-2. The scores 620'B-1, 620'B-2, 620'B-3, and 620'B-4 may belong to a set 730B associated with the connector 510C.

With the determination of the set of scores 625' (e.g., the sets 730A and 730B) for each server 106, the quality evaluator 535 may identify or select at least one score 625' from the set of scores 625' for the servers 106 with respect to each candidate connector 510. In selecting, for each candidate connector 510, the quality evaluator 535 may determine or other identify whether the servers 106 are of a same function type or a different type. To identify, the quality evaluator 535 may obtain, determine, or otherwise identify a function type of each server 106. The function type may be identified based on the application 610 that the server 106 is associated with. In the depicted example, the servers 106A-1 and 106A-2 may provide resources for the same application 610 and may be thus be of the same function type. The servers 106B-1 and 106B-2 may provide resources for a different application 610. The servers 106B-1 and 106B-2 may be of the same function type with each other, but the function type of the servers 106B-1 and 106B-2 may differ from the function type of the servers 106A-1 and 106A-2. According to the function types of the servers 106, the quality evaluator 535 may select the score 625' from the set of scores 625' (e.g., the sets 730A and 730B) for the servers 106 with respect to each candidate connector 510.

Among the servers 106 of the same function type, the quality evaluator 535 may identify or select the best score 625' from the set of scores 625' with respect to each candidate connector 510. In addition, the quality evaluator 535 may select or identify the server 106 with the best score 625' with respect to each candidate connector 510 for the connection between the candidate connector 510 and the client 102. In some embodiments, the quality evaluator 535 may identify an identifier for the server 106 with the best score 625'. The identifier for the server 106 may be an alphanumeric identifier or a network address referencing the server 106. In the depicted example, the servers 106A-1 and 106A-2 may be of one function type, whereas the servers 106B-1 and 106B-2 may be of another function type. With respect to the connector 510B, the quality evaluator 535 may perform a selection 755A of the server 106A-2 having the best score 625' out of the scores 625'A-1 and 625'A-2 for the servers 106A-1 and 106A-2 respectively. The quality evaluator 535 may perform a selection 755B of the server 106B-1 having the best score 625' out of the scores 625'A-3 and 625'A-4 for the servers 106B-1 and 106B-2 respectively. In each case, the scalar values of the scores 625' may be the highest scalar value for the respective function type. As discussed above, for the same function type, the best score 625' may be selected, as the connector 510 is to access resources on the server 106 with the highest performance on behalf of the client 102. The selection of one of the servers 106 of the same function type may be repeated with respect to each candidate connector 510 (e.g., the connector 510B and 510C).

Among the sets of servers 106 of different function types, the quality evaluator 535 may identify or select the worst score 625' from the set of scores 625' of the selected servers 106 with respect to each candidate connector 510. In selecting, the quality evaluator 535 may identify the score 625' corresponding to each selected server 106 of the respective function type. In the depicted example, the quality evaluator 535 may identify the score 625'A-2 for the server 106A-2 of the selection 755A and the score 625'A-3 for the server 106B of the selection 750B. Upon identifying, the quality evaluator 535 may compare the scores 625' from the selected servers 106 with one another. Based on the comparison, the quality evaluator 535 may find or identify the worst score 625'. In the depicted example, the quality evaluator 535 may perform a selection 760 of the score 625'A-3 as having the lowest scalar value and thus the worst score 625' out of the scores 625'A-2 and A-3. The selection may be repeated with respect to each candidate connector 510. The worst score 625' may be identified for use in determining the predicted quality of the network conditions between the client 102 and the connector 510 (e.g., the connector 510B).

The quality evaluator 535 may calculate, generate, or otherwise determine at least one network quality score 630 for each candidate connector 510. The determination of the network quality score 630 may be based on the score 625 for the connector 510 and the selected score 625' (e.g., the score 625'A-3 of the selection 760). The determination of the network quality score 630 may be calculated in a similar manner as discussed above, for example, as a weighted average of scores 625 and 625' determined from scaled metrics 620 and 620' respectively. The network quality score 630 may indicate a predicted, objective measure of the network quality and user experience with respect to a potential session between the client 102 and the respective candidate connector 510. In the depicted example, the quality evaluator 535 may determine a network quality score 630A for the candidate connector 510B using the score 625A and the score 625'A-3 for the selected server 106B-1. The quality evaluator 535 may repeat the calculation of the network quality scores 630 for each candidate connector 510.

Using the determination of the network quality scores 630 (e.g., the network quality scores 630A and 630B), the site selector 540 executing on the client 102 may perform a selection 705 of at least one of the candidate connectors 510 for connecting with the client 102. In some embodiments, the site selector 540 may find, identify, or otherwise select one of the candidate connectors 510 based on at least one of the network quality scores 630. To select, the site selector 540 may compare the network quality scores 630 for the candidate connectors 510 with one another. From comparing, the site selector 540 may select the candidate connector 510 with the best network quality score 630. In the depicted example, from performing the selection 705, the site selector 540 may identify the connector 510B as having the highest value for the network quality score 630A.

Figure 8:
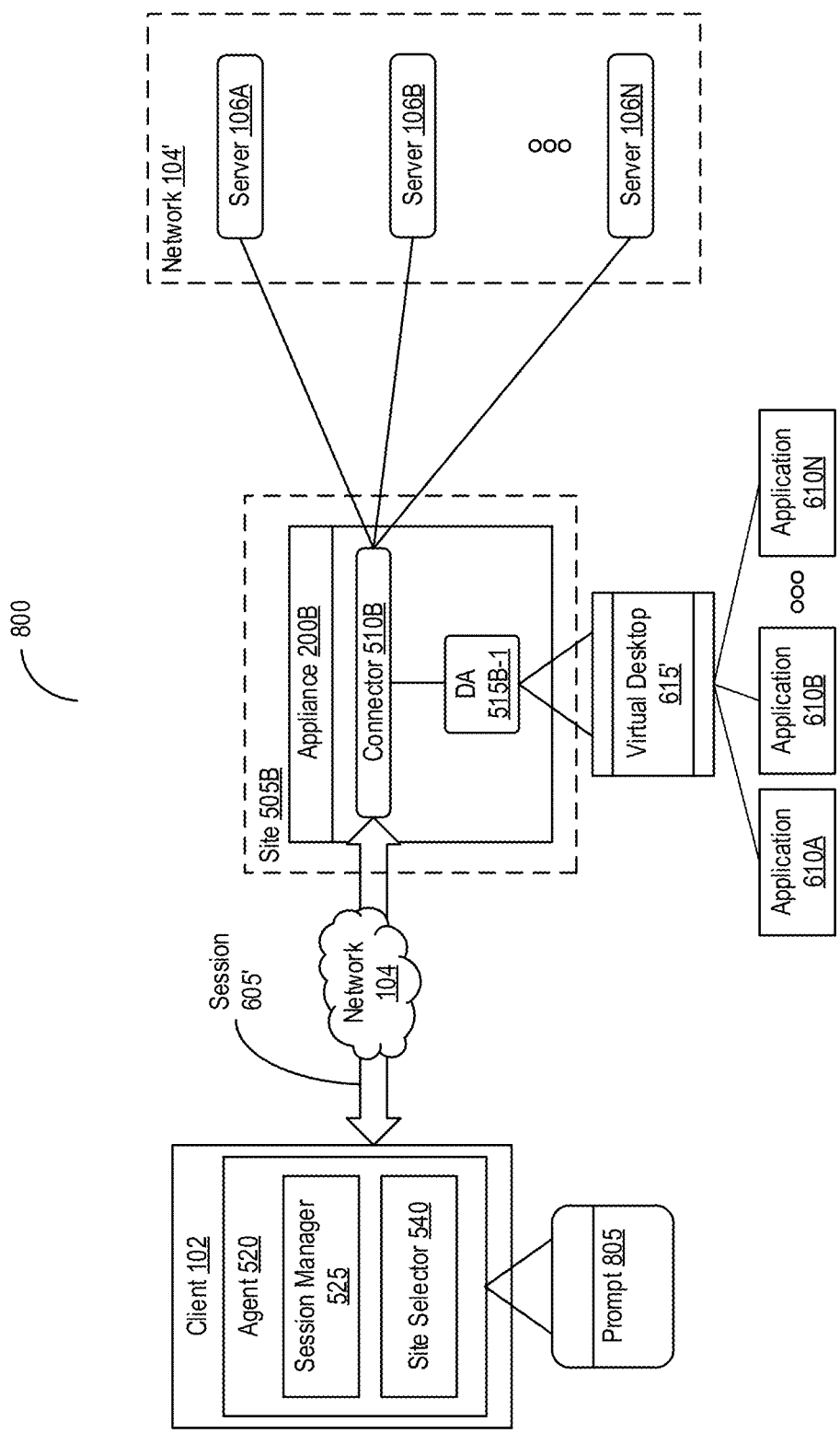
FIG. 8 is a block diagram of an embodiment of a process for switching connectors with which to establish a session in the system for establishing session, in accordance with an illustrative embodiment.

Referring now to FIG. 8, depicted is a block diagram of a process 800 for switching connectors with which to establish a session in the system 500. The process 800 may correspond to operations performed in the system 500 for establishing a new session with the selected connector. The process 800 may be a continuation of process 700, 725, or 750. Under the process 800, the site selector 540 may convey, present, or otherwise provide at least one prompt 805. The prompt 805 may identify the connector 510 to which to establish a new session 605' for the client 102. Continuing from the example depicted in FIG. 7C, the connector 510 may correspond to the connector 510B selected as having the best network quality score 630. The prompt 805 may be a graphical user interface (GUI) presented in a display of the client 102. The prompt 806 may be a displayed as a GUI of an application associated with the agent 520, one of the applications 610, or the virtual desktop 615, among others. The prompt 805 may include a message inquiring the user of the client 102 whether to accept or reject the selected connector 510 for the new session 605'.

While the prompt 805 is presented, the site selector 540 may monitor for an interaction with the prompt 805. The interaction may indicate one of an acceptance (or selection) of the selected connector 510 with which to establish the new session 605' or a rejection (or decline) of the selected connector 510. The prompt 805 may include at least one option for acceptance and another option for rejection. The options identified in the prompt 805 may, for example, be indicated using GUI elements such as a command button, a radio button, a check box, and a text box, among others. The prompt 805 may be presented or provided for a defined duration of time on the display of the client 102.

When a rejection of the connector 510 is indicated via the prompt 805, the site selector 540 may determine that current session 605 is to be maintained. The site selector 540 may relay, send, or otherwise provide an indication to maintain the current session 605 to the session manager 525. The session manager 525 may in turn maintain the current session 605, and allow the user of the client 102 to access the applications 610 via the virtual desktop 615. In some embodiments, the site selector 540 may refrain from or cease providing the prompt 805 during the remainder of the session 605. In addition, the site selector 540 may send, convey, or otherwise provide an indication to the network monitor 530 to cease monitoring of the metrics 620 and 620'. The halt of the monitoring may also lead to an end to determination of the network quality scores 630 and the selection of a new connector 510. In some embodiments, the site selector 540 may refrain from or cease providing the prompt 805 for a defined duration of time. After the duration, the site selector 540 may provide the prompt 805 again to the user of the client 105. In some embodiments, the site selector 540 may provide an indication to repeat the monitoring of the metrics 620 and 620' to the network monitoring to repeat the process as discussed above.

Otherwise, when the acceptance or selection of the connector 510 is indicated via the prompt 805, the site selector 540 may determine that the new session 605' is to be established with the selected connector 510. In response to the determination, the site selector 540 may convey, send, or otherwise provide an identification of the selected connector 510 to the session manager 525 for the to-be-established session 605'. The identification may include an alphanumeric identifier or a network address (e.g., Internet Protocol (IP) address or media access control (MAC) address) referencing the connector 510. In addition, the site selector 540 may provide an identification of each server 106 selected for the connector 510 to the session manager 525. The identification for the server 106 may include the alphanumeric identifier or the network address of the selected servers 106. Continuing from the example depicted in FIG. 7C, the site selector 540 may provide the identifiers for the connector 510B, the server 106A-2, and the server 106B-1 to the session manager 525. In some embodiments, the site selector 540 may provide the identification of the connector 510 or the servers 106 to the session manager 525, automatically without providing the prompt 805.

The session manager 525 may initiate and establish at least one session 605' with the connector 510 of an appliance 200. The session 605' may be to provide the client 102 access applications 610 via the selected connector 510 (e.g., the connector 510B) using the resources hosted on the selected servers 106. The establishment of the session 605' may be similar to the establishment of the session 605 discussed above. To initialize, the session manager 525 may provide, send, or otherwise transmit a request for the session 605' to the appliance 200 or the connector 510 at the same site 505 as the appliance 200 (e.g., the site 505B and appliance 200B) via the network 104. In some embodiments, when the request is received by the appliance 200, the appliance 200 may send or forward the request to the connector 510. The request may identify the servers 106 selected using the scores 625' as discussed above. The request may include identifications of the servers 106 to provide the resources for the applications 610 to be accessed in the session 605'. In some embodiments, the request may also identify or include authentication credentials for the user of the client 102, such as an account identifier and a passcode, among others. The authentication credentials may be identified or obtained from the request used to initialize the previous session 605, thereby negating the user from having to re-enter the account identifier and passcode.

With the receipt of the request, the connector 510 may find, identify, or select the deliver agent 515 for the session 605' to provide the client 102 access to the applications 610. In some embodiments, the connector 510 may parse the request to identify or extract the authentication credentials, including the account identifier and the passcode. Based on the identification of the user, the connector 510 may authenticate and verify the user using the authentication credentials. Upon successful authentication, the connector 510 may identify the servers 106 to be accessed for the session 605' from the request. In some embodiments, the connector 510 may parse the request to identify or extract the identifications of the servers 106 to be connected with for the session 605'.

Using the identification of the servers 106, the connector 510 may identify or select the delivery agent 515 from the set of delivery agents 515 managed by the connector 510. As discussed above, the connector 510 may handle, interface with, or manage the set of delivery agents 515 at the site 505 of the appliance 200. When there are no delivery agents 515, the connector 510 may create, launch, or otherwise instantiate the delivery agent 515 for the session 605. If there are multiple available delivery agents 515, the connector 510 may select the delivery agent 515 through which the servers 106 are accessible for the session 605. In any event, the connector 510 may set or configure the delivery agent 515 to access the servers 106 identified from the request for the applications 610. The delivery agent 515 may Upon selection, the connector 510 may set, assign, or otherwise use the delivery agent 515 for the session 605'. The delivery agent 515 may interface or facilitate communications with the selected servers 106 to provide the client 102 access to the applications 610 for the session 605. In some embodiments, the connector 510 may invoke the delivery agent 515 to provide at least one virtual desktop 615'. The virtual desktop 615' may be a part of a physical or virtual machine (e.g., the virtual machine 306), and may be a graphical user interface (GUI) to facilitate accessing of the applications 610 for the session 605'. In some embodiments, the connector 510 may modify, configure, or otherwise set the virtual desktop 615 of the delivery agent 515 to provide access to the requested applications 610 using the resources from the servers 106 identified in the request. The provision of the virtual desktop 615' may correspond to a completion of the establishment of the session 605' between the client 102 and the connector 510 over the network 104.

With the establishment of the session 605', the user of the client 102 may access one or more the applications 610 available through the delivery agent 515. The servers 106 that the delivery agent 515 communicates with for the session 605' may be the servers 106 selected using the scores 625 and 625' when selecting the connector 510 (e.g., the connector 510). Upon detecting the interaction with the virtual desktop 615', the delivery agent 515 may communicate with the server 106 hosting resources for the application 610. From interfacing with the server 106, the delivery agent 515 may generate and provide an output in response to the request via the session 605'. The connector 510 may facilitate and handle communications on between the servers 106 and the client 102 for the delivery agent 515.

By establishing the new session 605' in this manner, the agent 520 may automatically detect that the session 605 may be undergoing degraded performance and that the user at client 102 is having a poor experience in accessing the applications 610. With the detection, the agent 520 may determine network quality scores 630 to objectively quantify the expected performance and experience for other candidate connectors 510. Using these network quality scores 630, the agent 520 may switch to another connector 510 to provide a better performance and experience. Furthermore, as the delivery agents 515 may instantiated upon request for the new session 605', the amount of network and computing resources consumed at each site 505 may be reduced. Also, by providing the user the prompt 805 to whether to select the recommended connector 510, the agent 520 may afford the user greater ability to control the connections between the client 102 and the applications 610 to be accessed.

Figure 9:
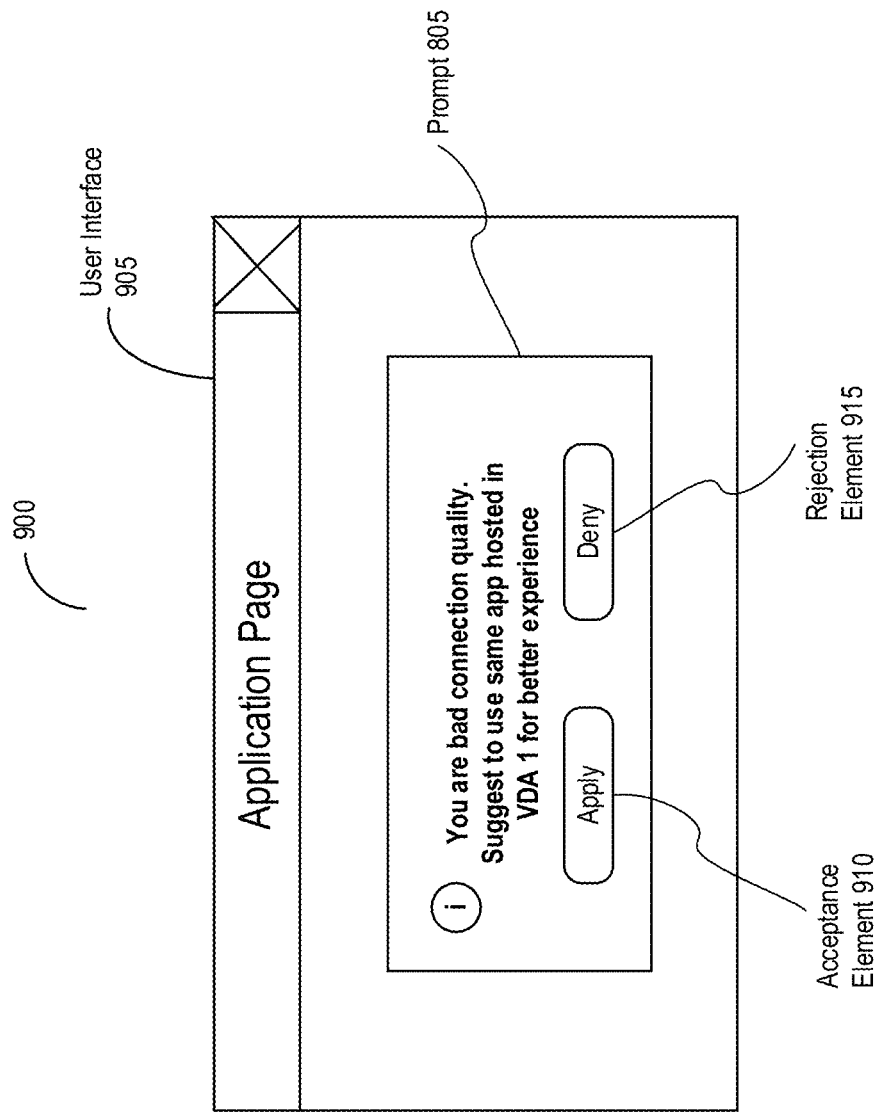
FIG. 9 is a screenshot of an embodiment of a user interface including a prompt for switching connectors in the system for establishing session, in accordance with an illustrative embodiment.

Referring now to FIG. 9, depicted is a screenshot 900 of a user interface 905 for switching connectors in the system 500. The user interface 905 may correspond to a graphical user interface (GUI) for an application associated with the agent 520, the virtual desktop 615', or one of the applications 610, among others. As depicted, the prompt 805 may include a message notifying the user of the client 102 that the connection quality of the current session 605 is poor. The message of the prompt 805 may also provide a recommendation of another connector 510 to which to establish a new session 605'. The prompt 805 may include at least one acceptance element 910 and at least one rejection element 915. The user of the client 102 may indicate the acceptance of establishing the new session 605' via the recommended connector 510 by interacting with the acceptance element 910. Conversely, the user of the client 102 may indicate the rejection of establishment of the new session 605' via the connector 510 by interacting with the rejection element 915.

Figure 10:
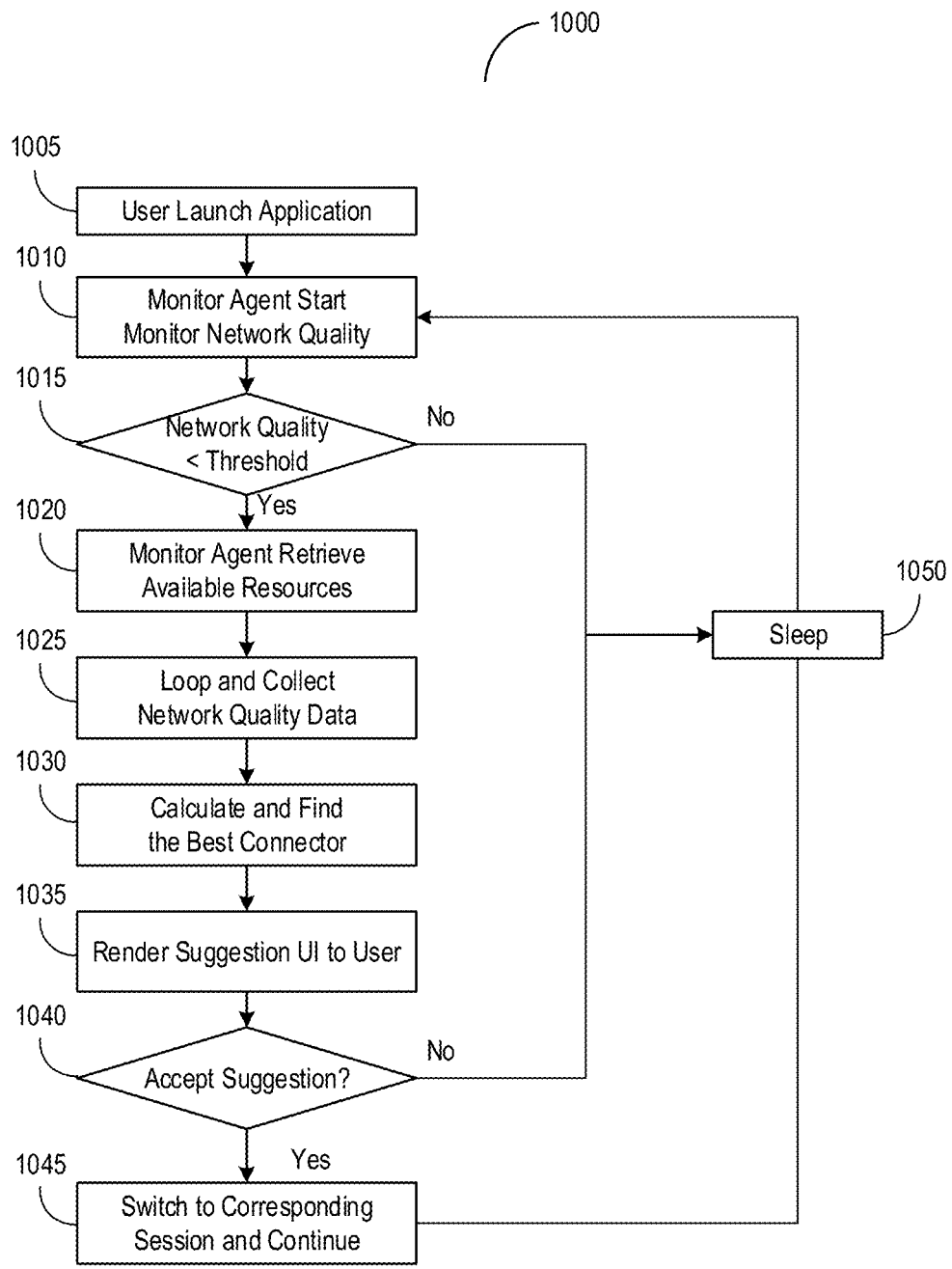
FIG. 10 is a flow diagram of an embodiment of a method of switching connectors according to network conditions, in accordance with an illustrative embodiment.

Referring now to FIG. 10 is a flow diagram of a method of switching connectors according to network conditions. The functionalities of method 1000 may be implemented using, or performed by, the components described in FIGS. 1-9, such as the agent 515. Under the method 1000, a user of a computing device launch an application via user interaction (1005). A monitor agent on the computing device may start to monitor network quality (1010). The computing device may determine whether the network quality is less than a threshold (1015). If the network quality is determined to be less than the threshold, the monitor agent may retrieve available resources (1020). The monitor agent may loop and collect network quality data (1025). The monitor agent may calculate and file the connector with the highest network quality (1030). The monitor agent may render a user interface identifying a suggestion of the connector to the user (1035). The monitor agent may determine whether the user has accepted the suggestion via the user interface (1040). If the user has accepted the suggestion, the computing device may switch to the corresponding session on the selected connector and continue (1045). If the user does not accept the suggestion or the network quality is greater than or equal to the threshold, the computing device may proceed to sleep (1050), and repeat the functionalities from monitor network quality (1010).

Figure 11:
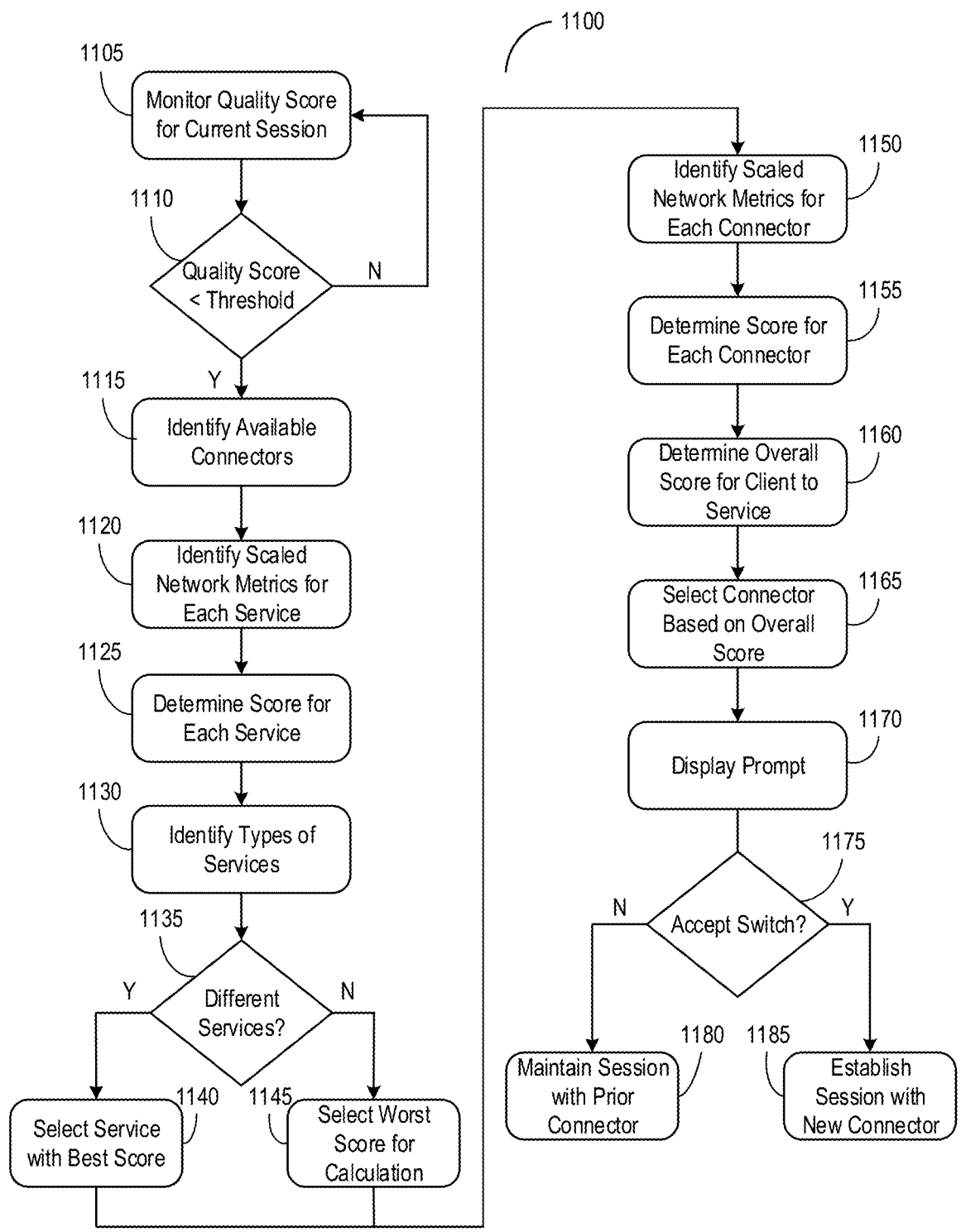
FIG. 11 is a flow diagram of an embodiment of a method of establishing sessions according to network conditions, in accordance with an illustrative embodiment.

Referring now to FIG. 11 is a flow diagram of a method 1100 of establishing sessions according to network conditions. The functionalities of method 1000 may be implemented using, or performed by, the components described in FIGS. 1-9, such as the agent 520. Under the method 1110, a computing device (e.g., the client 102) may monitor quality score (e.g., the network quality score 630) for current session (e.g., the session 605) (1105). The computing device may determine whether the quality score is less than a threshold (1110). If the quality score is greater than or equal to the threshold, the computing device may continue to monitor. Otherwise, if the quality score is less than the threshold, the computing device may identify available connectors (e.g., the connector 510B and 510C) (1115). The computing device may identify scaled network metrics (e.g., the metrics 620') between a connector and each service (e.g., the server 106) (1120). The computing device may determine a score (e.g., the score 625') between the connector and the corresponding service (1125).

Continuing on, the computing device may identify types of services (1130). The computing device may determine whether the services of different types (e.g., the servers 106A and 106B) (1135). If the services are determined to be of different types, the computing device may select the service with the best score (1140). If the services are determined to be of the same type (e.g., the server 106A-1 and 106A-2), the computing device may select the worst score for calculation (1145). The computing device may identify scaled network metrics (e.g., the metrics 620) between the computing device and each connector (1150). The computing device may determine a score (e.g., the score 625) for the computing device and each connector (1155). The computing device may determine an overall score (e.g., the network quality score 630) for the client to the service via the respective connector (1160). The computing device may select the connector based on the overall score (1165). The computing device may display a prompt (e.g., the prompt 805) identifying the suggested connector to which to switch (1170). The computing device may determine whether the switch is accepted (1175). If the switch is not accepted, the computing device may maintain the current session with the prior connector (1180). On the other hand, if the switch is accepted, the computing device may establish a session (e.g., the session 605') with the new connector (1185).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

It will be further understood that various changes in the details, materials, and arrangements of the parts that have been described and illustrated herein may be made by those skilled in the art without departing from the scope of the following claims.

We claim:

1. A method of establishing a session, comprising:
identifying, by a client to access at least one of a plurality of services via a connector, a plurality of metrics on network conditions between the connector and a corresponding service of the plurality of services;
using, by the client, at least one value of the plurality of metrics to scale each metric of the plurality of metrics;
determining, by the client, a score for each service of the plurality of services as a function of each of the plurality of scaled metrics for the corresponding service;
selecting, by the client, from the plurality of services, a service based at least on the score; and
establishing, by the client, a session with the connector to access the selected service.

2. The method of claim 1, further comprising:
identifying, by the client to access the service via at least one of a plurality of connectors, a second plurality of metrics on network conditions between the client and a corresponding connector of the plurality of connectors;
using, by the client, at least one value of the second plurality of metrics to scale each of the second plurality of metrics;
determining, by the client, a score for each connector of the plurality of connectors as the function of each of second plurality of scaled metrics for the corresponding connector; and
selecting, by the client, from the plurality of connectors, the connector based at least on the score and the second score.

3. The method of claim 1, further comprising determining, by the client accessing at least one of the plurality of services via a second session with a second connector, a second score for the second connector of the plurality of connectors as a function of each of a second plurality of scaled metrics for the second connector, and
wherein identifying the first plurality of metrics further comprises identifying the first plurality of metrics between the connector different from the second connector and the corresponding service, responsive to determining that the second score for the second connector does not satisfy a threshold.

4. The method of claim 1, further comprising:
determining, by the client accessing at least one of the plurality of services via a second session with a second connector, a second score for the second connector of the plurality of connectors as a function of each of a second plurality of scaled metrics for the second connector, and
continuing, by the client, the second session to access at least one of the plurality of services, responsive to determining that the second score for the second connector satisfies a threshold.

5. The method of claim 1, further comprising identifying, by the client, that the plurality of services are of different types, and
wherein selecting the service further comprises selecting, from the plurality of services, the service having a highest score with which the client is to access via the session.

6. The method of claim 1, further comprising identifying, by the client, that the plurality of services, and
wherein selecting the service further comprises selecting, from the plurality of services, the service having a lowest score with which to determine a second score for network conditions between the client and the connector.

7. The method of claim 1, further comprising providing, by the client, a prompt identifying the connector with which to establish the session to access the service; and
wherein establishing the session further comprises establishing the session with the connector to access the service, responsive to a selection of the connector via the prompt.

8. The method of claim 1, further comprising:
providing, by the client, a prompt identifying the connector with which to establish the session to access the service; and
maintaining, by the client, a second session with a second connector to access at least one of the plurality of services, responsive to a rejection of the connector via the prompt.

9. The method of claim 1, wherein using at least one value of the plurality of metrics to scale further comprises using a minimum value and a maximum value of the plurality of metrics to scale the plurality of metrics in accordance with a normalization function.

10. The method of claim 1, wherein establishing the session further comprises establishing the session with the connector to initiate a virtual desktop via which the service is accessible.

11. A system for selecting a connector, comprising:
a device comprising one or more processors coupled with memory configured to:
identify a plurality of metrics on network conditions between a connector and a corresponding service of a plurality of services;
use at least one value of the plurality of metrics to scale each metric of the plurality of metrics;
determine a score for each service of the plurality of services as a function of each of the plurality of scaled metrics for the corresponding service;
select, from the plurality of services, a service based at least on the score; and
establish a session with the connector to access the selected service.

12. The system of claim 11, wherein the device is configured to:
identify a second plurality of metrics on network conditions between the device and a corresponding connector of a plurality of connectors;
use at least one value of the second plurality of metrics to scale each of the second plurality of metrics;
determine a score for each connector of the plurality of connectors as the function of each of second plurality of scaled metrics for the corresponding connector; and
select, from the plurality of connectors, the connector based at least on the score and the second score.

13. The system of claim 11, wherein the device is configured to:
determine a second score for a second connector of the plurality of connectors as a function of each of a second plurality of scaled metrics for the second connector, the second connector used to access at least one of the plurality of services via the second session and
identify the first plurality of metrics between the connector different from the second connector and the corresponding service, responsive to determining that the second score for the second connector does not satisfy a threshold.

14. The system of claim 11, wherein the device is configured to:
- identify that the plurality of services are of different types; and
- select, from the plurality of services, the service having a highest score with which the device is to access via the session.

15. The system of claim 11, wherein the device is configured to:
- identify that the plurality of services, that the plurality of services are of a same type; and
- select, from the plurality of services, the service having a lowest score with which to determine a second score for network conditions between the device and the connector.

16. The system of claim 11, wherein the device is configured to:
- provide a prompt identifying the connector with which to establish the session to access the service; and
- establish the session with the connector to access the service, responsive to a selection of the connector via the prompt.

17. The system of claim 11, wherein the device is configured to use a minimum value and a maximum value of the plurality of metrics to scale the plurality of metrics in accordance with a normalization function.

18. A non-transitory computer readable medium storing program instructions for causing one or more processors to:
- identify a plurality of metrics on network conditions between a connector and a corresponding service of a plurality of services;
- use at least one value of the plurality of metrics to scale each metric of the plurality of metrics;
- determine a score for each service of the plurality of services as a function of each of the plurality of scaled metrics for the corresponding service;
- select, from the plurality of services, a service based at least on the score; and
- establish a session with the connector to access the selected service.

19. The non-transitory computer readable medium of claim 18, wherein the instructions further cause the one or more processors to:
- identify a second plurality of metrics on network conditions between the device and a corresponding connector of a plurality of connectors;
- use at least one value of the second plurality of metrics to scale each of the second plurality of metrics;
- determine a score for each connector of the plurality of connectors as the function of each of second plurality of scaled metrics for the corresponding connector; and
- select, from the plurality of connectors, the connector based at least on the score and the second score.

20. The non-transitory computer readable medium of claim 18, wherein the instructions further cause the one or more processors to:
- determine a second score for a second connector of the plurality of connectors as a function of each of a second plurality of scaled metrics for the second connector, the second connector used to access at least one of the plurality of services via the second session and
- identify the first plurality of metrics between the connector different from the second connector and the corresponding service, responsive to determining that the second score for the second connector does not satisfy a threshold.

\* \* \* \* \*